(12) United States Patent
Nakase et al.

(10) Patent No.: US 9,131,140 B2
(45) Date of Patent: Sep. 8, 2015

(54) IMAGE PICKUP APPARATUS AND IMAGE PICKUP METHOD

(75) Inventors: Yuichi Nakase, Tokyo (JP); Atsushi Inagaki, Yokohama (JP); Masato Sanno, Tokyo (JP); Hitoshi Ikeda, Kawasaki-shi (JP); Chiyumi Niwa, Kawasaki (JP); Hitoshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1170 days.

(21) Appl. No.: 12/187,377

(22) Filed: Aug. 6, 2008

(65) Prior Publication Data
US 2009/0040315 A1  Feb. 12, 2009

(30) Foreign Application Priority Data

Aug. 10, 2007 (JP) .................. 2007-210242
Apr. 28, 2008 (JP) .................. 2008-117296

(51) Int. Cl.
| | |
|---|---|
| H04N 5/77 | (2006.01) |
| H04N 5/232 | (2006.01) |
| G06F 17/30 | (2006.01) |
| H04N 1/00 | (2006.01) |
| H04N 1/32 | (2006.01) |
| H04N 5/235 | (2006.01) |
| H04N 5/345 | (2011.01) |
| H04N 9/804 | (2006.01) |
| H04N 9/82 | (2006.01) |
| H04N 5/781 | (2006.01) |

(Continued)

(52) U.S. Cl.
CPC ...... *H04N 5/23212* (2013.01); *G06F 17/30247* (2013.01); *H04N 1/00167* (2013.01); *H04N 1/32128* (2013.01); *H04N 5/2354* (2013.01); *H04N 5/23219* (2013.01); *H04N 5/23245* (2013.01); *H04N 5/3454* (2013.01); *H04N 5/772* (2013.01); *H04N 9/8042* (2013.01); *H04N 9/8227* (2013.01); *H04N 5/781* (2013.01); *H04N 5/907* (2013.01); *H04N 2101/00* (2013.01); *H04N 2201/325* (2013.01); *H04N 2201/3214* (2013.01); *H04N 2201/3215* (2013.01); *H04N 2201/3226* (2013.01); *H04N 2201/3277* (2013.01)

(58) Field of Classification Search
USPC .......................... 386/239, 240, 241, 223–229
See application file for complete search history.

(56) References Cited

U.S. PATENT DOCUMENTS

2003/0210335 A1* 11/2003 Carau et al. ............... 348/231.2
2003/0220894 A1* 11/2003 Russon ........................ 707/1

(Continued)

FOREIGN PATENT DOCUMENTS

| CN | 1780357 A | 5/2006 |
|---|---|---|
| CN | 1801890 A | 7/2006 |

(Continued)

*Primary Examiner* — Nigar Chowdhury
(74) *Attorney, Agent, or Firm* — Canon U.S.A., Inc. IP Division

(57) ABSTRACT

Disclosed is a technique for allowing proper classification information to be provided to an edited image. When it is determined that the editing is cropping, a system controller cuts a decompressed image down to a desired size using an image processor and performs face detection on a crop image. The system controller generates a header for image data of an edited image. When the setting of automatically providing classification information is "ON", classification information is automatically provided based on the detected face information.

6 Claims, 27 Drawing Sheets

(51) Int. Cl.
*H04N 5/907* (2006.01)
*H04N 101/00* (2006.01)

(56) References Cited

U.S. PATENT DOCUMENTS

| | | | |
|---|---|---|---|
| 2006/0050166 A1* | 3/2006 | Sonoda et al. | 348/333.01 |
| 2006/0064639 A1 | 3/2006 | Reid et al. | |
| 2006/0110148 A1 | 5/2006 | Kim et al. | |
| 2006/0146167 A1 | 7/2006 | Aizawa et al. | |
| 2006/0170669 A1* | 8/2006 | Walker et al. | 345/418 |
| 2006/0227385 A1* | 10/2006 | Kawada | 358/302 |
| 2007/0211150 A1* | 9/2007 | Hirata | 348/211.6 |
| 2008/0002035 A1* | 1/2008 | Yoshida | 348/222.1 |
| 2008/0013787 A1* | 1/2008 | Kobayashi | 382/103 |
| 2011/0037890 A1* | 2/2011 | Nozaki | 348/350 |

FOREIGN PATENT DOCUMENTS

| | | |
|---|---|---|
| CN | 1950722 A | 4/2007 |
| JP | 2003-143444 | 5/2003 |
| JP | 2003230086 A | 8/2003 |
| JP | 2004227164 A | 8/2004 |
| JP | 2005-055939 A | 3/2005 |
| JP | 2005-223758 A | 8/2005 |
| JP | 2005-250716 A | 9/2005 |
| JP | 2006-025238 A | 1/2006 |
| JP | 2007104649 A | 4/2007 |
| JP | 2007121654 A | 5/2007 |
| WO | 2007060980 A1 | 5/2007 |

\* cited by examiner

FIG. 12

| | |
|---|---|
| Header | 1201 |
| * 0 Sound | 1202 |
| #0 Frame | 1203 |
| #1 Frame | 1204 |
| #2 Frame | 1205 |
| ⋮ | |
| #Rate-1 Frame | 1206 |
| * 1 Sound | 1207 |
| #0 Frame | 1208 |
| #1 Frame | 1209 |
| #2 Frame | 1210 |
| ⋮ | |
| #Rate-1 Frame | 1212 |
| ⋮ | |
| * N-1 Sound | 1213 |
| #0 Frame | 1214 |
| #1 Frame | 1215 |
| #2 Frame | 1216 |
| ⋮ | |
| #Rate-1 Frame | 1217 |
| Index | 1218 |

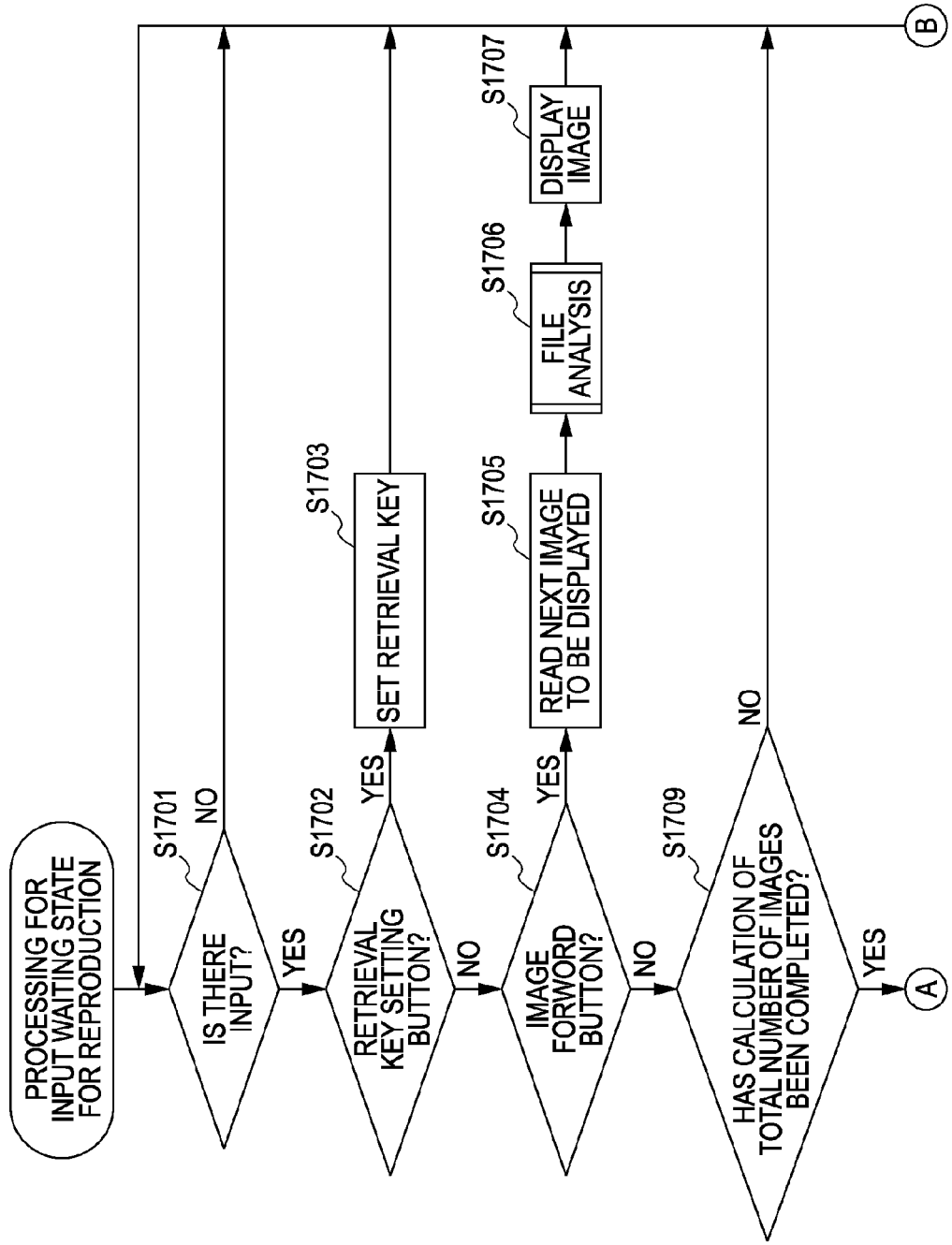

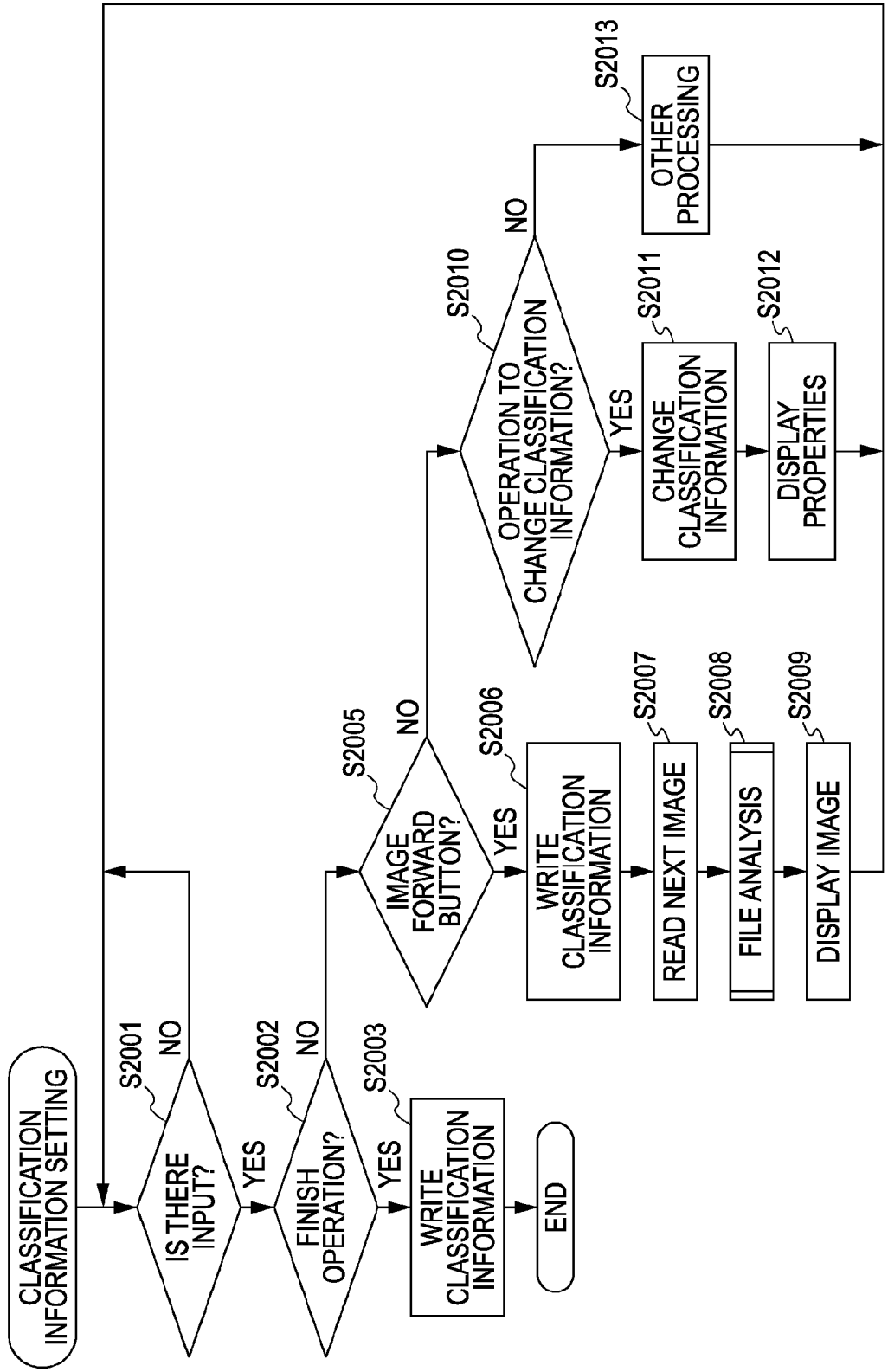

CROPPING

CROPPING

IMAGE PICKUP APPARATUS AND IMAGE PICKUP METHOD

BACKGROUND OF THE INVENTION

1. Field of the Invention

The present invention relates to an image pickup apparatus capable of providing an image with classification information and to a method therefor.

2. Description of the Related Art

With the widespread use of digital cameras, storing data of an image captured by a digital camera and image data captured from a personal computer (hereinafter referred to as a "PC") on various types of recording media by the digital camera and the PC has become popular.

Image data stored on a recording medium is reproduced by an image reproducing apparatus, such as a digital camera, a PC, or a printer, in order to be viewed, edited, organized, or other reasons.

There are a digital camera, a PC, and a printer that can provide images with properties for enabling efficient image retrieval and that allows a user to retrieve an image using the properties as a retrieval key.

There is a digital camera that can display an in-focus position of a captured image. One such example technique disclosed in Japanese Patent Laid-Open No. 2003-143444 can display an in-focus position in an enlarged manner to facilitate a user to easily recognize it. There is a technique for storing position information on an in-focus position in a captured image.

However, in the above mentioned techniques, because an image is viewed by use of a history of editing (operation), provision of proper properties according to the content of an image is not considered. In particular, when an image is subjected to editing, such as cropping, which cuts out a wanted portion from an image, classification information different from that representing conditions in capturing may be proper.

For example, in the case of an image of people captured in a shooting mode suited for capturing images of people, the provision of classification information regarding people to the image raises no problem at this time, but such people classification information is probably inconvenient when a portion other than people is cut out from the image by cropping.

SUMMARY OF THE INVENTION

The present invention provides a technique for providing proper classification information to an edited image.

The present invention also provides a technique for judiciously editing photographing information provided to an image at the time of image editing. The present invention also provides a technique for allowing photographing information to be suitably displayed at the time of image reproduction.

According to an aspect of the present invention, an image pickup apparatus includes an image capturing unit configured to capture an image, a setting unit configured to set a shooting mode for use in the image capturing unit, a providing unit configured to provide the image captured by the image capturing unit with classification information in accordance with the shooting mode set by the setting unit or in accordance with subject information detected from the captured image, and an editing unit configured to edit the image that has classification information provided by the providing unit. When the image is edited by the editing unit, the providing unit is configured to determine the classification information of the image in accordance with a result of editing performed by the editing unit and provide the determined classification information to the edited image.

Further features of the present invention will become apparent from the following description of exemplary embodiments (with reference to the attached drawings).

BRIEF DESCRIPTION OF THE DRAWINGS

FIG. 12 illustrates an example format for storing moving-image data.

FIGS. 17A and 17B are flowcharts that illustrate one example processing for an input waiting state for reproducing an image.

FIG. 20 is a flowchart that illustrates one example processing for classification information setting mode.

DESCRIPTION OF THE EMBODIMENTS

Embodiments are described below with reference to the accompanying drawings. In the embodiments described below, an example in which the present invention is applied to an image pickup apparatus capable of capturing a still image and moving image (e.g., digital camera) is described.

First Embodiment

Structure of Digital Camera

Figure 1:
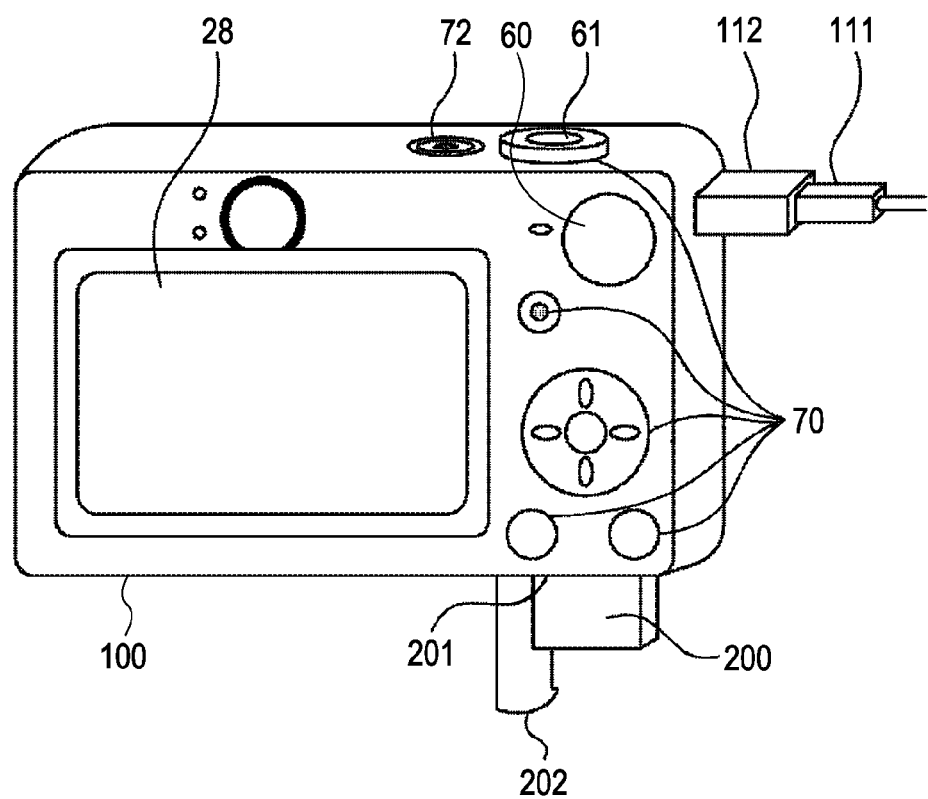
FIG. 1 is an external view of a digital camera according to an embodiment of the present invention.

FIG. 1 is an external view of a digital camera 100 according to an embodiment of the present invention. An image display portion 28 displays an image and various kinds of information. A power switch 72 is used to switch the power between on and off states. Reference numeral 61 indicates a shutter release button. A mode selector 60 is used to switch among various modes for use in the digital camera 100. Specifically, the mode is switchable among still-image recording mode, movie recording mode, and reproducing mode, for example.

An operation portion 70 is configured to receive various kings of operation from a user. The operation portion 70 includes various kinds of button, which are illustrated in FIG. 1, and an operation member, such as a touch panel on the screen of the image display portion 28. Examples of the various buttons of the operation portion 70 include an Erase button, a Menu button, a Set button, four direction buttons (up, down, right, and left buttons) positioned in a cross arrangement, and a scroll wheel.

A connection cable 111 is configured to connect the digital camera 100 to an external device. A connector 112 is configured to connect the connection cable 111 and the digital camera 100 together.

A storage medium 200 can be, for example, a memory card and a hard disk. A storage medium slot 201 is configured to house the storage medium 200. The storage medium 200 can communicate with the digital camera 100 when being housed in the storage medium slot 201. A lid 202 is configured to cover the storage medium slot 201.

Figure 2:
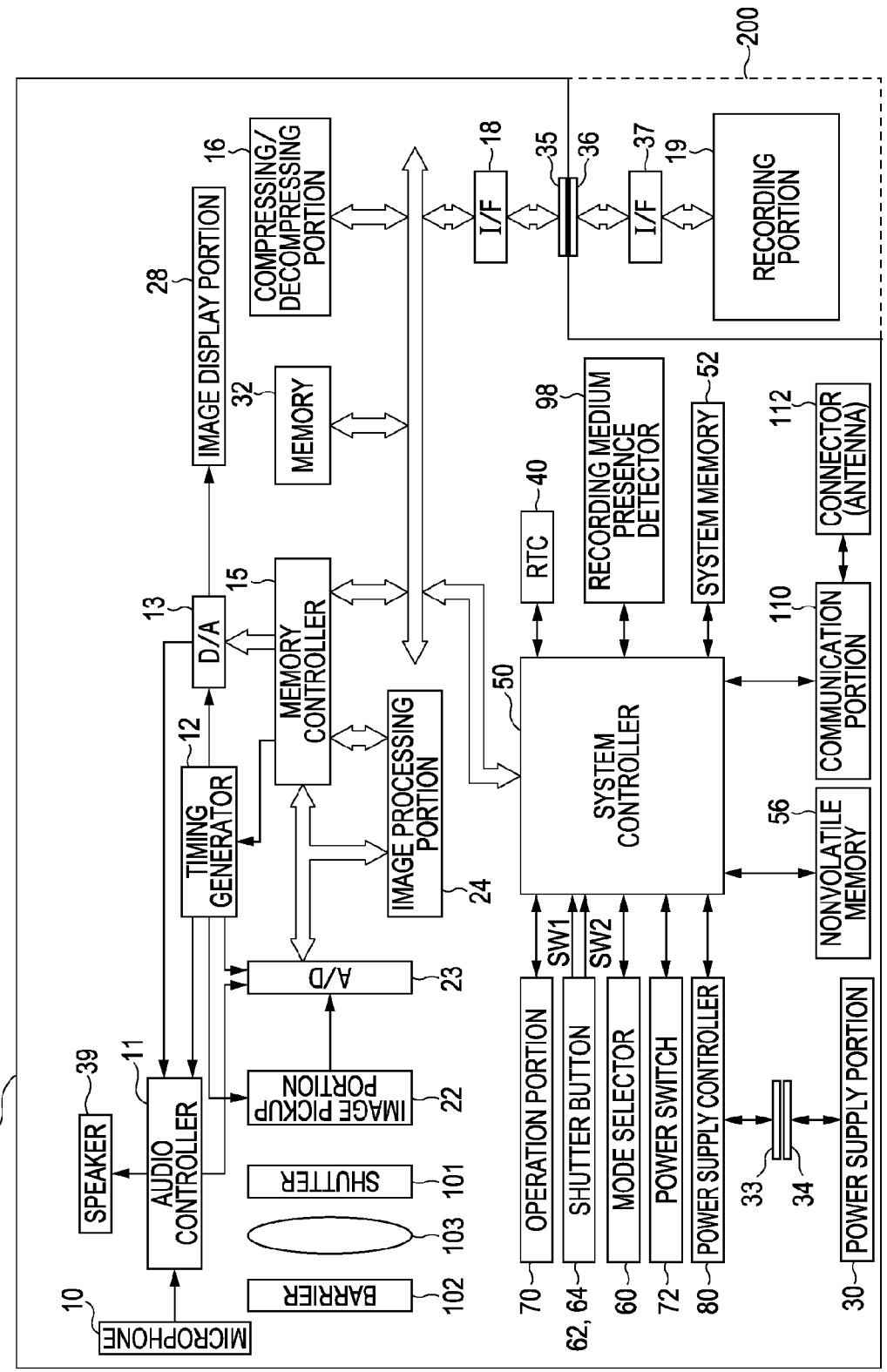
FIG. 2 is a block diagram that illustrates an example structure of the digital camera according to the embodiment.

FIG. 2 is a block diagram that illustrates an example structure of the digital camera 100 according to the present embodiment. An image pickup portion 22 includes a charge-coupled device (CCD) or a complementary metal-oxide semiconductor (CMOS) element. The image pickup portion 22 converts an optical image formed through an image taking lens 103 and a shutter 101 having the aperture capability into an electrical signal. A barrier 102 is configured to protect an image pickup system, which includes the image taking lens 103, the shutter 101, and the image pickup portion 22, from contamination or breakage by covering an image pickup section, which includes the image taking lens 103 of the digital camera 100.

An analog-to-digital (A/D) converter 23 is configured to convert an analog signal to a digital signal. The A/D converter 23 is used to convert an analog signal output from the image pickup portion 22 into a digital signal and to convert an analog signal output from an audio controller 11 into a digital signal.

A timing generator 12 is controlled by a memory controller 15 and a system controller 50. The timing generator 12 is configured to supply a clock signal or a control signal to the image pickup portion 22, the audio controller 11, the A/D converter 23, or a digital-to-analog (D/A) converter 13.

An image processor 24 is configured to perform predetermined processing, such as resizing or color conversion (e.g., pixel interpolation or reduction), on data from the A/D converter 23 or the memory controller 15. The image processor 24 is configured to perform predetermined calculation using obtained image data and enable the system controller 50 to control exposure and distance measuring based on results of the calculation. This enables through-the-lens (TTL) autofocusing (AF), autoexposure (AE), and electronic flash pre-emission (EF) processing. In addition, the image processor 24 is configured to perform predetermined calculation using obtained image data and also perform TTL automatic white balance (AWB) based on results of the calculation.

Data output from the A/D converter 23 is written into a memory 32 through the image processor 24 and the memory controller 15 or directly through the memory controller 15. The memory 32 stores image data that is digital data converted by the A/D converter 23 from data obtained by the image pickup portion 22 and also stores image data to be displayed on the image display portion 28. The memory 32 is also used to store audio data recorded through a microphone 10, a still image, a moving image, and a file header for use in an image file. Accordingly, the memory 32 has a storage capacity sufficient to store data of a predetermined number of still images, a predetermined time length of moving images and audio data.

A compressing/decompressing portion 16 is configured to compress or decompress image data using, for example, adaptive discrete cosine transform (ADCT). The compressing/decompressing portion 16 is configured to read and compress obtained image data stored in the memory 32 using the shutter 101 as a trigger and write the processed data into the memory 32. The compressing/decompressing portion 16 is configured to decompress compressed image data read from, for example, a recording portion 19 of the storage medium 200 to the memory 32 and write the processed data into the memory 32. Image data written to the memory 32 by the compressing/decompressing portion 16 is formed into a file in a file portion of the system controller 50, and the file data is recorded on the storage medium 200 through an interface 18. The memory 32 also serves as a memory for displaying an image (video memory).

The D/A converter 13 is configured to convert image data to be displayed stored in the memory 32 into an analog signal and supply it to the image display portion 28. The image display portion 28 is configured to display data on a display (e.g., liquid crystal display (LCD)) based on an analog signal supplied from the D/A converter 13. In such a way, image data to be displayed written to the memory 32 is displayed by the image display portion 28 through the D/A converter 13.

An audio signal output from the microphone 10 is supplied to the A/D converter 23 through the audio controller 11, which includes, for example, an amplifier. The audio signal is converted into a digital signal by the A/D converter 23, and then the digital signal is stored into the memory 32 by the memory controller 15. Audio data recorded on the storage medium 200 is read into the memory 32 and then converted into an analog signal by the D/A converter 13. By use of this analog signal, the audio controller 11 drives a speaker 39 and outputs audio data.

A nonvolatile memory 56 is a memory whose contents are electrically erasable and recordable and can be, for example, electrically erasable programmable read-only memory (EEPROM). The nonvolatile memory 56 stores constants for use in operation of the system controller 50 and a program. The program used here represents a program for executing flowcharts described later in the present embodiment.

The system controller 50 controls the entire digital camera 100. The system controller 50 performs processing described below in the present embodiment by executing a program stored in the above-described nonvolatile memory 56. A system memory 52 can be a random-access memory (RAM) and develops constants and variables for use in operation of the system controller 50 and a program read from the nonvolatile memory 56.

The mode selector 60, a first shutter switch 62, a second shutter switch 64, and the operation portion 70 are an operating unit used to input various kinds of operation instruction to the system controller 50. The mode selector 60 is used to switch the operating mode of the system controller 50 among the still-image recording mode, the movie recording mode, and the reproducing mode, for example.

The first shutter switch 62 is turned on in the middle of operation (half press) of the shutter release button 61 of the digital camera 100 and generates a first shutter switch signal SW1. In response to the first shutter switch signal SW1, the system controller 50 starts AF, AE, AWB, EF, and/or other processing.

The second shutter switch 64 is turned on upon completion of operation of the shutter release button 61 (full press) and generates a second shutter switch signal SW2. In response to the second shutter switch signal SW2, the system controller 50 starts an operation for a series of steps of an image capturing process from reading of a signal from the image pickup portion 22 to writing of image data on the storage medium 200.

Selecting a function icon among various kinds of function icons displayed on the image display portion 28 assigns an appropriate function to each of operation members of the operation portion 70 on a scene-by-scene basis, allowing the operation members to serve as a functional button. Examples of the functional button include a Finish button, a Return button, an Image Forward button, a Jump button, a Narrowing button, and a Property Change button. For example, when a Menu button is pressed, a menu screen for allowing a user to specify various settings appears on the image display portion 28. The user can intuitively specify various settings using the menu screen displayed on the image display portion 28, the four direction buttons, and the Set button. The power switch 72 is used to switch the power between the on and off states.

A power supply controller 80 includes a battery detecting circuit, a DC-DC converter, and a switching circuit for switching a block to be energized and is configured to detect the presence of a battery being attached, the type of an attached battery, and the remaining battery life. The power supply controller 80 controls the DC-DC converter in response to results of the detection and instructions from the system controller 50 and supplies a necessary voltage to components, including the storage medium 200, for a necessary period. A power supply portion 30 can include a primary cell (e.g., alkaline cell or lithium cell), a secondary cell (e.g., nickel-cadmium (NiCd) battery, nickel metal hydride (NiMH) battery, or a lithium (Li) battery), or an AC adapter. Connectors 33 and 34 are configured to connect the power supply portion 30 and the power supply controller 80 together.

A real time clock (RTC) 40 is configured to measure the date and time. The RTC 40 has an internal power supply portion aside from the power supply controller 80, so it can keep measuring the time even when the power supply portion 30 is turned off. The system controller 50 sets a system timer using the date and time obtained from the RTC 40 at startup and executes timer control.

The interface 18 is an interface with the storage medium 200 (e.g., memory card or hard disk). A connector 35 is configured to connect the interface 18 to the storage medium 200. A recording medium presence detector 98 is configured to detect whether the storage medium 200 is attached to the connector 35.

The storage medium 200 (e.g., memory card or hard disk) includes the recording portion 19, which includes a semiconductor memory or magnetic disk, an interface 37 with the digital camera 100, and a connector 36 for being connected to the digital camera 100.

A communication portion 110 can perform various kinds of communication, such as RS-232C, universal serial bus (USB), IEEE1394, P1284, SCSI, modem, LAN, and wireless communication. The connector 112, which is an antenna in the case of wireless communication, is configured to connect the digital camera 100 to other devices through the communication portion 110.

General Operation of Digital Camera

Figure 3:
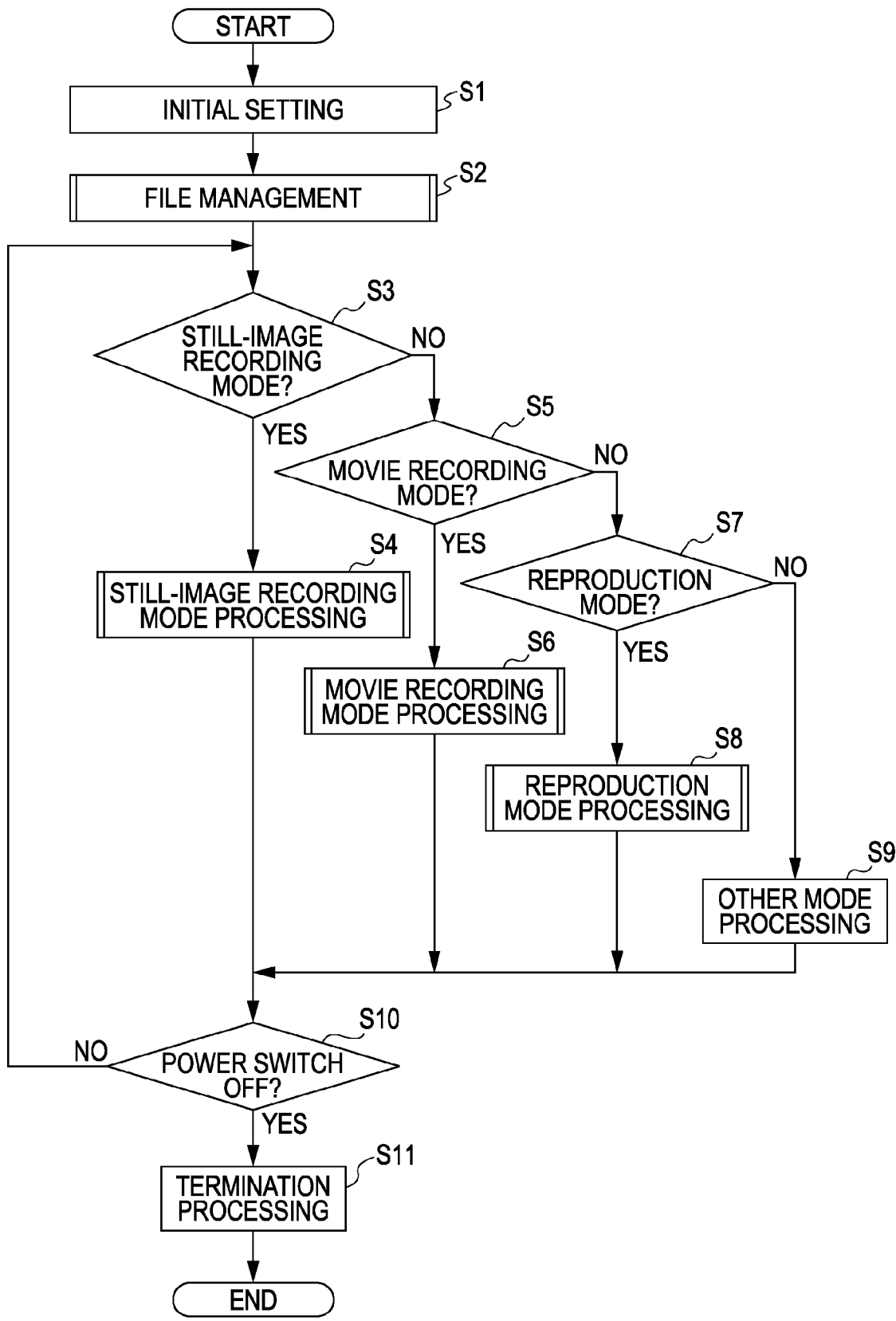
FIG. 3 is a flowchart that illustrates an example general operation of the digital camera according to the embodiment.

FIG. 3 is a flowchart that illustrates an example general operation of the digital camera 100 according to the present embodiment. When the power switch 72 is operated and the power is switched on, in step S1, the system controller 50 initializes a flag and control variable.

Then, in step S2, the system controller 50 starts management of a file stored in the storage medium 200. This file management process will be described later with reference mainly to FIG. 21.

Then, in steps S3, S5, and S7, the system controller 50 determines the set position of the mode selector 60. If the mode selector 60 is determined to be set at the still-image recording mode, flow proceeds to step S4 through step S3. In step S4, processing for the still-image recording mode is executed. This processing for the still-image recording mode will be described later with reference mainly to FIG. 4. If the mode selector 60 is determined to be set at the movie recording mode, flow proceeds to step S6 through steps S3 and S5. In step S6, processing for the movie recording mode is executed. This processing for the movie recording mode will be described later with reference mainly to FIG. 11. If the mode selector 60 is determined to be set at the reproducing mode, flow proceeds to step S8 through steps S3, S5, and S7. In step S8, processing for the reproducing mode at which a captured still image or moving image is reproduced. This processing for the reproducing mode will be described later with reference mainly to FIG. 15. If the mode selector 60 is determined to be set at the other modes, flow proceeds to step S9. In step S9, a process corresponding to a selected mode is executed. Examples of the other modes include processing for transmission mode at which a file stored in the storage medium 200 is transmitted and processing for reception mode at which a file is received from an external device and stored in the storage medium 200. The processing for the reception mode of the above-mentioned example processes will be described later with reference to FIG. 14.

After the processing for a set mode specified by the mode selector 60 is executed (in step S4, S6, S8, or S9), flow proceeds to step S10. In step S10, the system controller 50 determines the set position of the power switch 72. If the power switch 72 is determined to be set at the power-on position, flow returns to step S3. If the power switch 72 is determined to be set at the power-off position, flow proceeds to step S11, where the system controller 50 performs termination processing. One example of the termination processing is changing the display appearing on the image display portion 28 to an end state. Other examples include closing the barrier 102 to protect the image pickup section, recording parameters including a flag and a control variable, set values, a set mode into the nonvolatile memory 56, and shutting off the power to a section unnecessary to receive the power. After the completion of the termination processing in step S11, flow finishes, and the status is switched to the power-off state.

Processing for Still-Image Recording Mode

Figure 4:
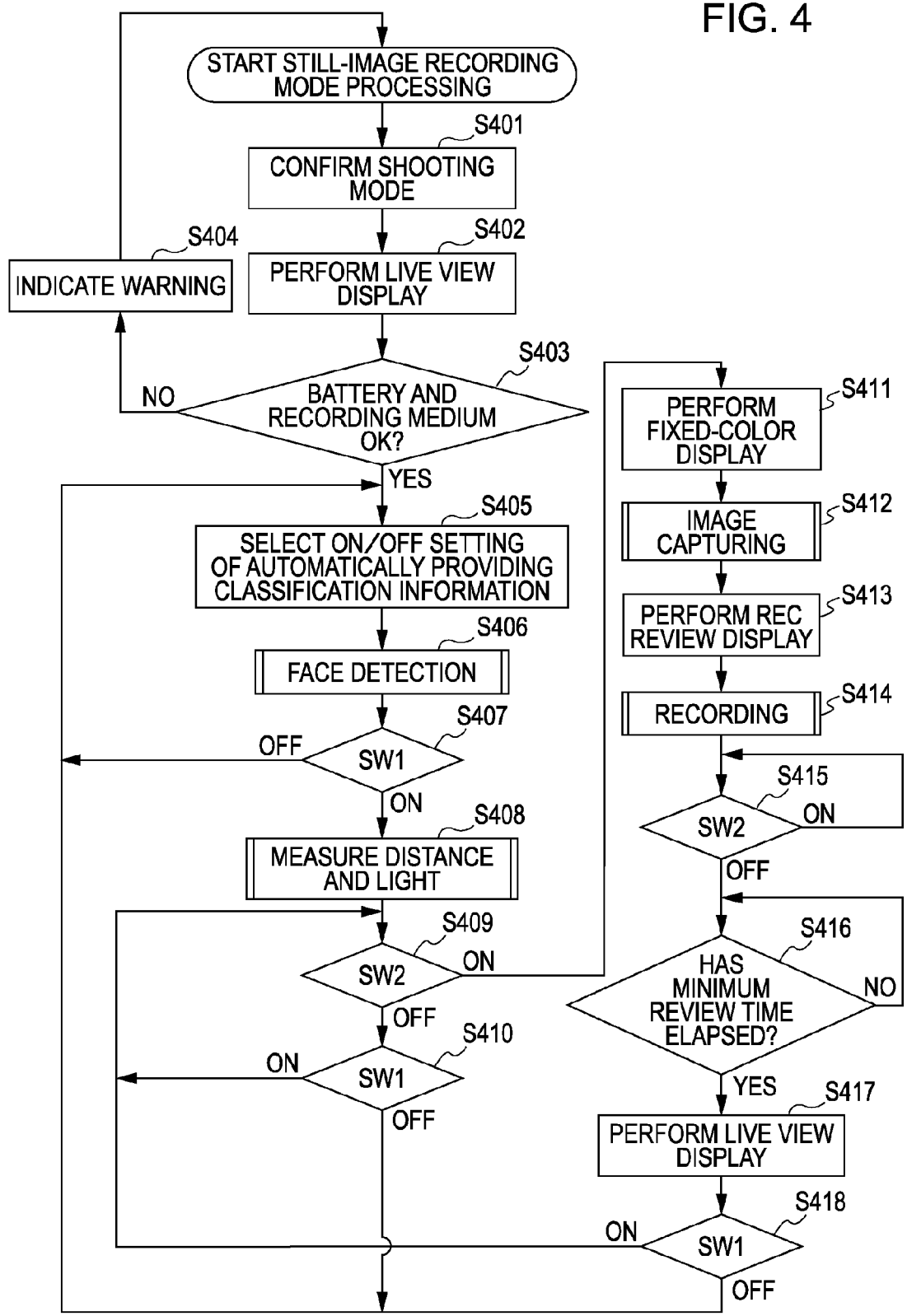
FIG. 4 is a flowchart that illustrates one example processing for still-image recording mode.

FIG. 4 is a flowchart that illustrates an example process occurring in the still-image recording mode illustrated in step S4 of FIG. 3. The processing for the still-image recording mode illustrated in FIG. 4 is finished by, for example, an interrupt when the mode is switched to another mode by the mode selector 60 or when the power switch 72 is set to the power-off position.

After starting the processing for the still-image recording mode, in step S401, the system controller 50 then confirms the shooting mode. The confirmation of the shooting mode is made by the following (1) or (2).

(1) The shooting mode used at the end of the previous processing for the still-image recording mode is obtained from the nonvolatile memory 56 and stored in the system memory 52.

(2) When a user specifies the shooting mode by operating the operation portion 70, the specified shooting mode is stored in the system memory 52.

The shooting mode is defined by a combination of a shutter speed, an aperture value, a state of flash lighting, sensitivity setting suited for a shooting scene. The digital camera 100 according to the present embodiment has the following shooting modes:

Automatic mode: Various parameters for use in the camera are automatically determined by a program embedded in the digital camera 100 based on a measured exposure value.

Manual mode: Various parameters for use in the camera are freely changeable by a user.

Scene mode: A combination of shutter speed, aperture value, state of flash lighting, and sensitivity setting suited for a shooting scene are automatically set.

The scene mode includes the following modes:

Portrait mode: Specializes in capturing images of people by bringing the person into focus while blurring the background.

Night Scene mode: Specializes in night scenes by illuminating the person with flash and recording the background with a slow shutter speed.

Landscape mode: Specializes in broad landscape scenes.

Night & Snapshot mode: Suited for beautifully capturing images of night scenes and people without using a tripod.

Kids & Pets mode: Images of quickly scampering children and animals can be captured without missing an opportunity to capture an image at the right moment.

Foliage mode: Suited for capturing brilliant images of greenery and autumn foliage and trees.

Party mode: Images of the subject are captured with a hue faithful to the subject under a fluorescent light or a light bulb while compensating for camera shake.

Snow mode: Images are captured even in a snow scene in the background without darkened people and bluish tint.

Beach mode: An image can be captured even in a scene of the surface of the sea or sandy beach that is highly reflective to the sunbeam without darkened people or other subjects.

Fireworks mode: An image of skyrocketing fireworks is clearly captured with an optimal exposure.

Aquarium mode: Sensitivity, white balance, and hue suited for capturing an image of fish in a water tank at an indoor aquarium are set.

Underwater mode: Images are captured using white balance optimized for an underwater scene with reduced bluish tint.

Referring back to FIG. 4, when the shooting mode is confirmed in step S401, then in step S402 the system controller 50 displays image data supplied from the image pickup portion 22 in the live view display state. Displaying an image in the live view display state used here means displaying an image obtained by an image pickup portion in real time. Then, in step S403, the system controller 50 determines whether there is no problem in operating the digital camera 100 caused by the remaining life of the power supply portion 30 (including, for example, a battery) by use of the power supply controller 80 and also determines whether there is no problem in operating the digital camera 100 caused by the presence/absence of the storage medium 200 or the remaining amount of the storage medium 200. If it is determined that there is a problem in the state of each of the power supply portion 30 and the storage medium 200 (YES in step S403), flow proceeds to step S404. In step S404, the image display portion 28 displays predetermined warning using an image or audio under the control of the system controller 50, and then flow returns to step S401.

If it is determined that there is no problem in the state of each of the power supply portion 30 and the storage medium 200 (NO in step S403), flow proceeds to step S405. In step S405, the system controller 50 specifies ON or OFF for the setting of automatically providing classification information if needed. A user can optionally select ON or OFF for the setting of automatically providing classification information from a menu screen (not shown) appearing on the image display portion 28 upon the pressing of the Menu button included in the operation portion 70. Specifying ON or OFF of the setting of automatically providing classification information is represented by a flag indicating whether classification information is to be automatically provided in accordance with a scene mode and subject information. The set value (on/off value of the flag) is retained in the system memory 52. Specifying ON or OFF of the setting of automatically providing classification information can prevent a user from providing unintended classification information depending on circumstances. The classification information will be described later.

Then, in step S406, the system controller 50 determines whether a person's face exists in an image signal displayed in the live view display state. An example process of this face detection will be described later with reference to FIG. 5. If a person's face has been detected in the face detection processing, the system controller 50 stores the coordinates of the position of the detected face in the image signal, the size of the detected face (e.g., width and height), the number of detected faces, a reliability coefficient, and other relevant information in the system memory 52 as face information. If no person's face has been detected in the face detection processing, zero is set to a region for the position coordinates, the size (e.g., width and height), the number of detected faces, a reliability coefficient, and other relevant information.

The face detection in step S406 employing an image for use in the live view display stored in the VRAM may use a captured image in itself being obtained from the CCD during the live view display.

Then, in step S407, the system controller 50 determines whether the first shutter switch signal SW1 is ON. If the first shutter switch signal SW1 is OFF (NO in step S407), flow returns to step S405, and processing of steps S405 and S406 is repeated. If the first shutter switch signal SW1 is ON (YES in step S407), flow proceeds to step S408. In step S408, the system controller 50 measures a distance to adjust the focus of the image taking lens 103 on the subject and performs metering to determine an aperture value and a shutter time (shutter speed). In the metering processing, the settings of the flash are made if needed. At this time, if a person's face has been detected in step S406, it is also possible that distance measuring be performed in a range of the detected face.

Then, in steps S409 and S410, the ON/OFF state of each of the first shutter switch signal SW1 and the second shutter switch signal SW2 is determined. If the second shutter switch signal SW2 is switched on while the first shutter switch signal SW1 is in the ON state (ON in step S409), flow proceeds to step S411. If the first shutter switch signal SW1 is switched off, i.e., the first shutter switch signal SW1 is released without switching on the second shutter switch signal SW2 (OFF in step S410), flow returns to step S405. Steps S409 and S410 are repeated while the first shutter switch signal SW1 is in the ON state and the second shutter switch signal SW2 is in the OFF state.

If the second shutter switch signal SW2 is switched on (the second shutter switch 64 is pressed), then in step S411, the system controller 50 sets the displaying state of the image display portion 28 from the live view display state to the fixed-color display state. Displaying an image in the fixed-color display state means displaying a single-color image for a certain period to let a user intuitively know that an image has been picked up upon the pressing of the shutter release button in a digital camera. In the present embodiment, a black image is displayed (blackout) in the fixed-color display state. Then, in step S412, the system controller 50 performs image capturing, including exposure and development. In the exposure, image data obtained through the image pickup portion 22 and the A/D converter 23 is written in the memory 32 through the image processor 24 and the memory controller 15 or directly through the memory controller 15 from the A/D converter 23. In the development, the system controller 50 reads image data written in the memory 32 using the memory controller 15 and, if needed, the image processor 24 and performs various kinds of processing on the read image data. This image capturing process will be described later with reference to FIG. 6.

Then, in step S413, the system controller 50 performs REC review displaying of image data obtained in the image capturing process on the image display portion 28. The REC review displaying is displaying image data for a predetermined period of time (review time) on the image display portion 28 before an image is recorded on a recording medium after the image of the subject is captured in order to let a user view a captured image. After REC review displaying the image data, in step S414, the system controller 50 performs recording of image data obtained in the image capturing process on the storage medium 200 as an image file. This recording process will be described later with reference to FIG. 7.

After the recording in step S414 is completed, in step S415, the system controller 50 determines whether the second shutter switch signal SW2 is in the ON state. If it is determined that the second shutter switch signal SW2 is in the ON state, the determination in step S415 repeats until the second shutter switch signal SW2 is switched off. During this time, the REC reviewing displaying of image data continues. That is, when the recording in step S414 has been completed, the REC reviewing displaying of image data on the image display portion 28 continues until the second shutter switch signal SW2 is switched off, i.e., the second shutter switch 64 is released. This allows a user to sufficiently view captured image data using the REC review capability by continuing the full press of the shutter release button 61.

After the user captures an image by fully pressing the shutter release button 61, when the full press state of the shutter release button 61 is released by the user taking his/her hand off the shutter release button 61, flow proceeds to step S416 from step S415. In step S416, the system controller 50 determines whether a predetermined review time has elapsed. If it is determined that the predetermined time has elapsed (YES in step S416), flow proceeds to step S417. In step S417, the system controller 50 returns the displaying state on the image display portion 28 to the live view display state from the REC review display state. This process enables the displaying state on the image display portion 28 to be automatically changed from the REC review display state to the live view display state, which sequentially displays image data from the image pickup portion 22, after captured image data is viewed in the REC review display state in order to be ready for the next image capturing.

In step S418, the system controller 50 determines whether the first shutter switch signal SW1 is in the ON state. If the first shutter switch signal SW1 is determined to be in the ON state in step S418, flow returns to step S409; if it is determined to be in the OFF state, flow returns to step S405. That is, if the half press state of the shutter release button 61 continues, i.e., the first shutter switch signal SW1 is in the ON state, the processing gets ready for the next image capturing (in step S409). If the shutter release button 61 is released, i.e., the first shutter switch signal SW1 is in the OFF state, a series of steps of the image capturing process is completed, and the processing returns to the state that waits for image capturing (in step S405).

Face Detection

Figure 5:
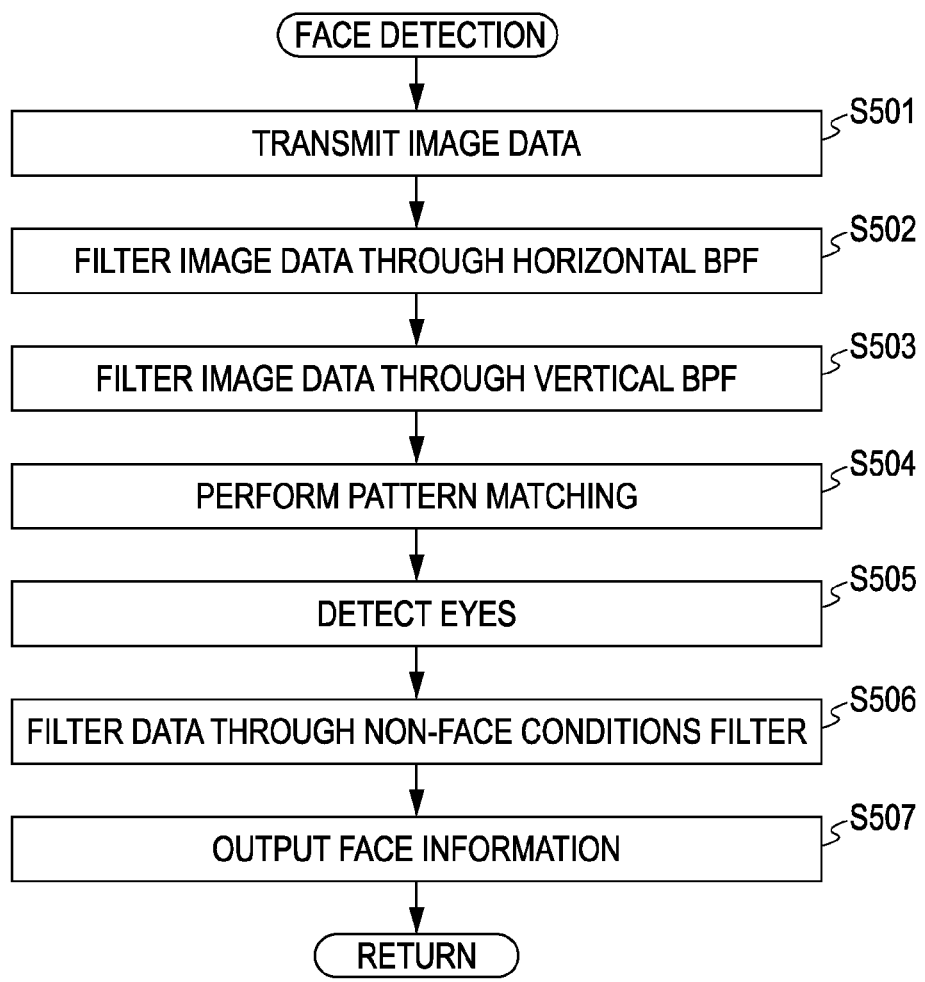
FIG. 5 is a flowchart that illustrates an example process of face detection.

One example of the face detection process in step S406 of FIG. 4 will now be described with reference to FIG. 5. In step S501, the system controller 50 transmits image data to be subjected to the face detection process to the image processor 24. In step S502, the image processor 24 filters the image data through a horizontal band-pass filter (BPF) under the control of the system controller 50. In step S503, the image processor 24 filters the image data processed in step S502 with the horizontal BPF through a vertical BPF under the control of the system controller 50. The use of the horizontal and vertical BPFs detects an edge component from the image data.

Then, in step S504, the system controller 50 performs pattern matching on the detected edge component to extract candidates of eyes, a nose, a mouse, and ears. Then, in step S505, the system controller 50 determines an object that satisfies a predetermined condition (e.g., the distance or slope of two eyes) as a pair of eyes from the candidates for eyes extracted in step S504 to narrow down the candidates for eyes to the objects having a pair of eyes. Then, in step S506, the system controller 50 associates the candidates for eyes narrowed in step S505 with corresponding other parts forming a face (nose, mouse, ears) and filters the data through a non-face conditions filter to detect the face. In step S507, the system controller 50 outputs the information on the face according to the results of the face detection in step S506, and the processing is completed.

As described above, subject information can be detected by extracting feature information of image data using the image data displayed in the live view displayed state. In the present embodiment, information on a face is described as one example of the subject information. However, other various kinds of information, for example, red-eye detection information, can also be used.

Image Capturing

One example of the image capturing process in step S412 of FIG. 4 will now be described with reference to FIG. 6. In step S601, the system controller 50 obtains the date and time at the start of image capturing from the system timer and stores it in the system memory 52. Then, in step S602, the system controller 50 opens the shutter 101 having the aperture capability according to the aperture value based on metering data stored in the system memory 52. This causes the image pickup portion 22 to start exposure (in step S603).

In step S604, the system controller 50 waits for the completion of the exposure performed by the image pickup portion 22 in accordance with the metering data. At the stop time of the exposure, in step S605, the system controller 50 closes the shutter 101. Then, in step S606, an electrical charge signal is read from the image pickup portion 22, and image data is written in the memory 32 through the A/D converter 23, the image processor 24, and the memory controller 15 or directly through the memory controller 15 from the A/D converter 23. Steps S601 to S606 correspond to an exposing process.

Then, in step S607, the system controller 50 reads image data stored in the memory 32 and sequentially performs image processing on the read image data using the memory controller 15 and, if needed, the image processor 24. Examples of this image processing include white balance and compression using the compressing/decompressing portion 16. The processed image data is written in the memory 32. In step S608, the system controller 50 reads the image data from the memory 32, decompresses the read image data using the compressing/decompressing portion 16, and resizes the image data to display it on the image display portion 28. After that, the system controller 50 transfers the resized image data to the D/A converter 13 through the memory controller 15 to display it on the image display portion 28. When a series of steps of this process is completed, the image capturing process is completed.

Recording

One example of the recording process in step S414 of FIG. 4 will now be described with reference to FIG. 7. In step S701, the system controller 50 generates a file name for image data to be recorded under file-naming rules. One example of the file-naming rules will be described later with reference to FIG. 9. Then, in step S702, the system controller 50 obtains the date and time information stored in the system memory 52 in step S601 of FIG. 6. Then, in step S703, the system controller 50 obtains information on the size of the image data to be recorded.

Then, in step S704, the system controller 50 determines whether a directory to store an image file generated from that image data exists in the storage medium 200. If it is determined that no such directory exists (NO in step S704), flow proceeds to step S705, where the system controller 50 generates a directory to store the image file. One example of rules for generating a directory name will be described later with reference to FIG. 9. Here, the name of 100XXX (902 in FIG. 9) is generated.

Figure 6:
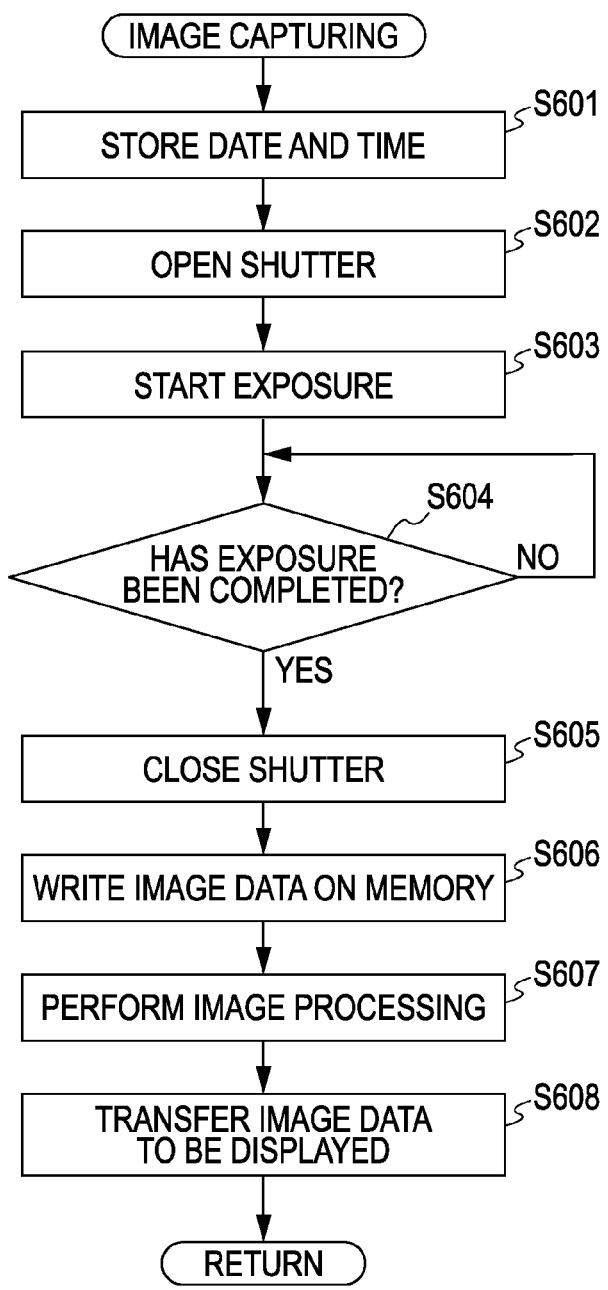
FIG. 6 is a flowchart that illustrates an example process of image capturing.
Figure 7:
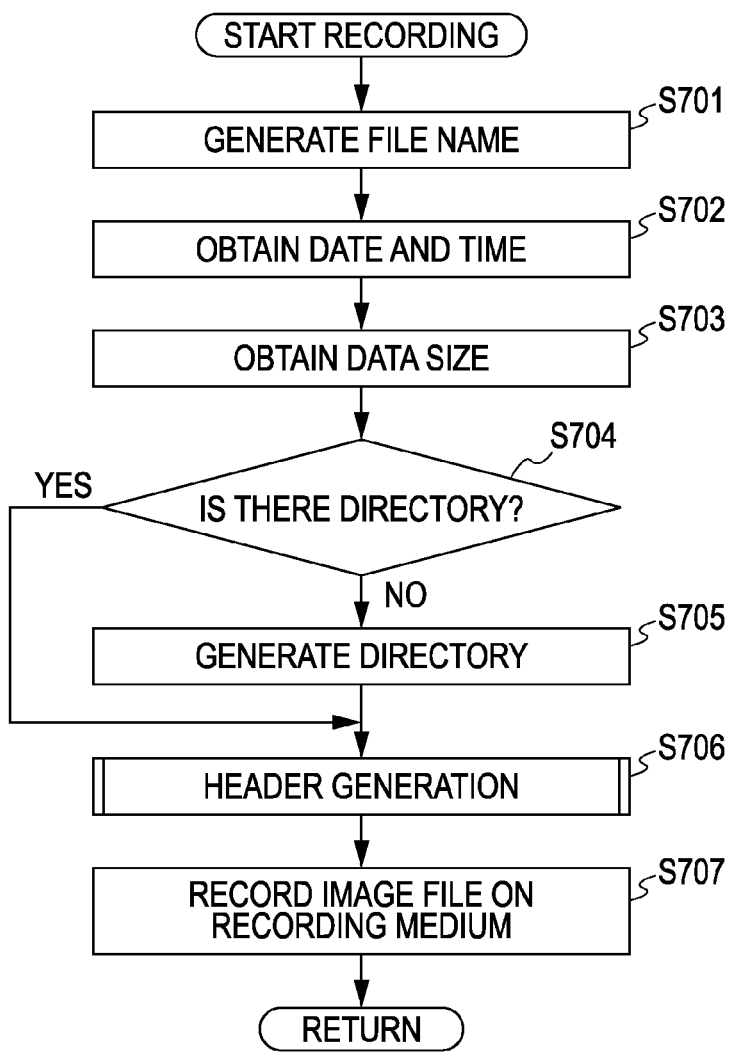
FIG. 7 is a flowchart that illustrates an example process of recording.

Then, in step S706, the system controller 50 generates a file header for image data stored in the memory 32 in step S607 of the image capturing process of FIG. 6. The file header is formed of information on the capturing date and the conditions at the time of capturing. One example of this header generation process will be described later with reference to FIG. 8. One example structure of the image file generated in the above-described way will be described later with reference to FIG. 9.

After the completion of generation of the header, in step S707, the system controller 50 generates a directory entry from the file name generated in step S701 and the date information obtained in step S702 and records the image file on the storage medium 200.

Header Generation

Figure 8:
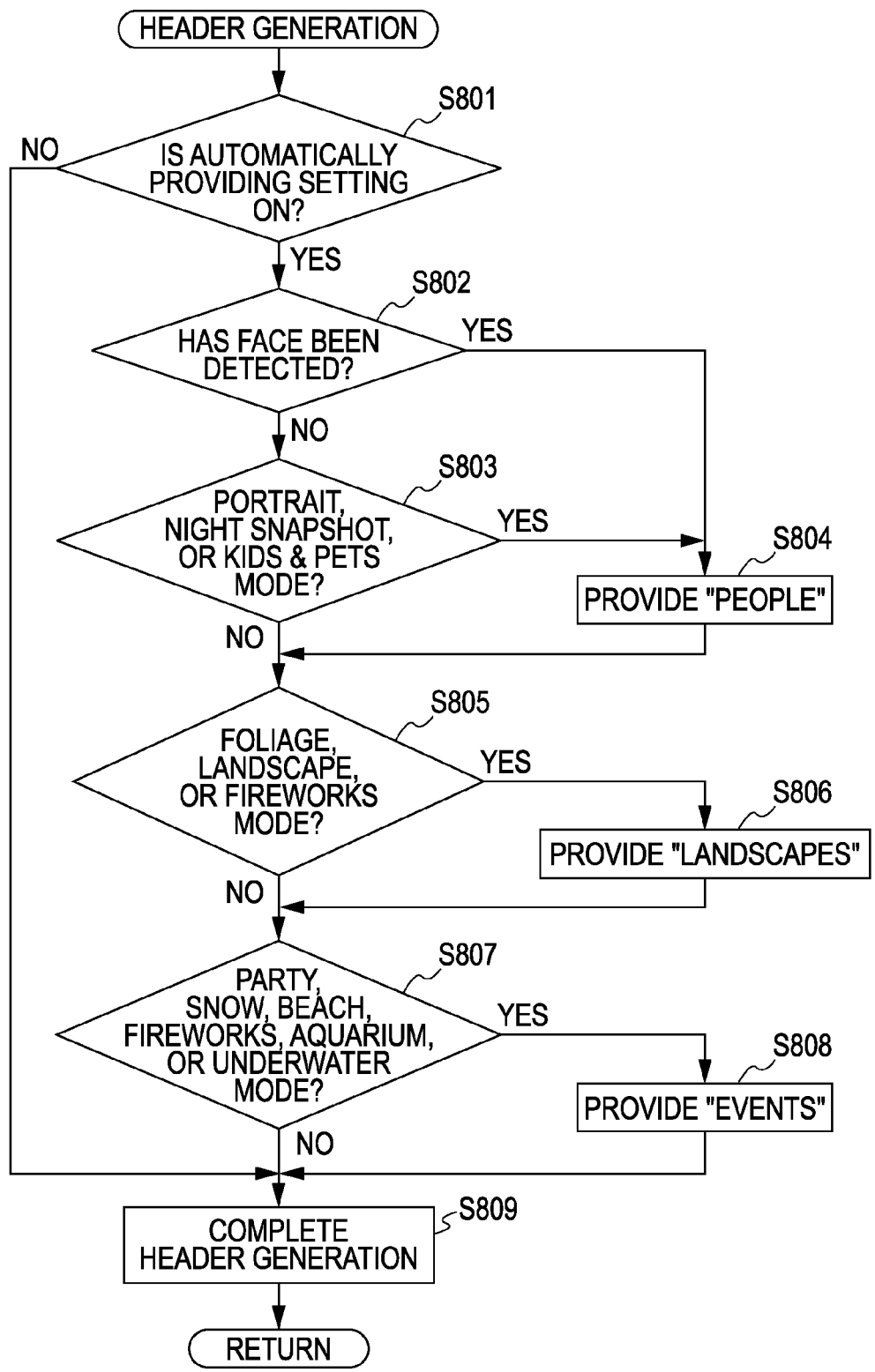
FIG. 8 is a flowchart that illustrates an example process of header generation.

One example of the header generation process in step S706 of FIG. 7 will now be described with reference to FIG. 8. In step S801, the system controller 50 obtains the set value for ON or OFF of the setting of automatically providing classification information specified in step S405 of FIG. 4 from the system memory 52 and determines whether classification information is to be automatically provided to captured image data. If it is determined that "OFF" is set to the set value for ON or OFF of the setting of automatically providing classification information, i.e., classification information is not to be automatically provided (NO in step S801), flow proceeds to step S809.

If it is determined that "ON" is set to the set value for ON or OFF of the setting of automatically providing classification information, i.e., classification information is to be automatically provided (YES in step S801), flow proceeds to step S802. In step S802, the system controller 50 reads the face information retained in the system memory 52 in step S406 of FIG. 4 and determines whether a face has been detected. If it is determined that a face has been detected (YES in step S802), flow proceeds to step S804, where classification information of "people" is provided. If it is determined that no face has been detected (NO in step S802), flow proceeds to step S803.

In step S803, the system controller 50 refers to the scene mode of the image at the time of capturing stored in the system memory 52 and determines whether the scene mode is any one of "Portrait mode", "Night snapshot mode", and "Kids & Pets mode." In these three modes, it is presumed that a person has been captured. If it is determined that the scene mode is any one of them (YES in step S803), flow proceeds to step S804, where the system controller 50 provides the image data with the classification information of "people." If the classification information of "people" is provided in step S804 or if it is determined that the scene mode is not any one of them (NO in step S803), flow proceeds to step S805.

As described above, in steps S802 to S804, from both the face information, which is one example of subject information, and the scene mode, which is one example of camera setting conditions at the time of capturing, the same classification information of "people" is provided. The subject information and the camera setting conditions at the time of capturing are different parameters at the time of capturing, but they may have a similar post-capturing meaning depending on the contents. Both the face information, which is one of the subject information, and the modes of "Portrait mode", "Night snapshot mode", and "Kids & Pets mode", which are one of the camera setting conditions at the time of capturing, have the same meaning that "it is presumed that a person has been captured." Accordingly, providing image data having such information with the same classification information enhances convenience in post-capturing operation (e.g., searching operation). That is, providing the same classification information using both specific subject information and specific camera setting conditions enables provision of classification information that is different from a parameter at the time of capturing and that is suited for post-capturing operation (e.g., searching operation). This can enhance convenience.

Additionally, the above-described classification information providing process can provide the same classification information for different scene modes of the Portrait mode, Night snapshot mode, and Kids & Pets mode. Different scene modes have different camera setting conditions at the time of capturing, but they may have a similar meaning. All of the Portrait mode, Night snapshot mode, and Kids & Pets mode have the same meaning that "it is presumed that a person has been captured." Accordingly, providing such image data with the same classification information enhances convenience in post-capturing operation (e.g., searching operation). That is, providing the same classification information for a plurality of kinds of specific setting conditions among the camera setting conditions at the time of capturing enables provision of classification information that is different from a parameter at the time of capturing and that is suited for post-capturing operation (e.g., searching operation). This can enhance convenience in post-capturing operation.

Referring back to FIG. 8, in step S805, the system controller 50 determines whether the scene mode is any one of "Foliage mode", "Landscape mode", and "Fireworks mode." In these three modes, it is presumed that a captured image is a scenic shot. If it is determined that the scene mode is any one of them (YES in step S805), flow proceeds to step S806, where the system controller 50 provides the image data with the classification information of "landscapes." If the classification information of "landscapes" is provided in step S806 or if it is determined that the scene mode is not any one of them (NO in step S805), flow proceeds to step S807.

In step S807, the system controller 50 determines whether the scene mode is any one of "Party mode", "Snow mode", "Beach mode", "Fireworks mode", "Aquarium mode", and "Underwater mode." In these modes, it is presumed that an event is captured. If it is determined that the scene mode is any one of them (YES in step S807), flow proceeds to step S808, where the system controller 50 provides the image data with the classification information of "events."

In the above-described process, two kinds of information "landscapes" and "events" are provided image data captured in the "Fireworks mode." That is, a plurality of kinds of information is provided from a single scene mode. Even in the same camera setting conditions at the time of capturing (scene mode), captured image data may have a plurality of meanings. One such example is an image captured in the "Fireworks mode." In such a case, the system controller 50 provides a plurality of kinds of classification information corresponding to post-capturing meanings. Therefore, classification information that is different from a parameter at the time of capturing and that is suited for post-capturing operation (e.g., searching operation) can be provided. This can enhance convenience in post-capturing operation in the digital camera 100.

In the case of "Automatic mode", "Manual mode", or other scene modes, which are determined to be NO in all of steps S803, S805, and S807, no classification information is provided.

After the completion of the process of providing classification information in a header, flow proceeds to step S809. In step S809, the system controller 50 generates header information using classification information and set values at the time of capturing, such as information on the capturing date.

If this process is performed in an editing process, information on coordinates described in the header is corrected, and this process is completed. The information on coordinates is information including the position information on an image, such as face information and focusing-frame information. When image data is edited such that its angle of field is changed, for example, in the case of cutting, such as cropping, or combining, coordinates information for a pre-edited image is improper for an edited image. To address this, in the case of cropping, the coordinates information is recalculated for an edited image based on the position of a cut portion and the size of the cut portion, and the recalculated coordinates information is described in the header. In the case of combining, the coordinates information is recalculated based on the position information of pre-combined images in a combined image, and the recalculated coordinates information is described in the header.

Alternatively, classification information that has been already changed by a user may not be updated (re-provided). This can be achieved by, for example, not reflecting detection of classification information in this process from the determination that the preceding classification information different from the preceding automatically provided classification information already described in the header is classification information that has been changed by a user. For example, when the automatically provided classification information "landscapes" has been already set and "landscapes" and "people" are set to classification information, it is determined that "people" is set by a user, so the property "people" is not changed regardless of a result of automatic provision. When a current result of automatic provision differs from the content of classification information described in the header, a user may be asked to select properties to be provided on a graphical user interface (GUI).

When a flag for enabling date printing on an image is set, the flag is cleared. The flag for date printing may be changed only when it is determined that printed date is not included in a crop area.

Referring back to FIG. 8, when the set value for ON or OFF of the setting of automatically providing classification information is determined to be off (NO in step S801), the setting of classification information (steps S802 to S808) is skipped, so header information that has no classification information is generated.

As described above, automatically providing classification information for use in, for example, searching at the time of capturing allows a user to immediately classify image data in the reproducing mode without having to perform known sorting of image files while viewing reproduced image data. Because the concepts of classification is based on both camera setting conditions at the time of capturing and subject information, classification information suited for the concepts for post-capturing operation (e.g., a search for image data) can be generated. The process illustrated in FIG. 8 corresponds to an example process performed by a providing unit.

In the foregoing, several example scene modes are described as camera setting conditions at the time of capturing at which classification information is automatically provided. However, the camera setting conditions are not limited to the above examples. Another example of automatically provision of classification information based on the camera setting conditions at the time of capturing is that, when a distant view is captured in the Manual mode, it is presumed that a landscape is captured, so the classification information "landscapes" is provided. Still another example is that, when an image is captured using a self-timer, at least one of two pieces of presumed classification information "people" and "events" is provided.

In the foregoing, the face information is described as one example of the subject information. However, the subject information is not limited to the face information. For example, red-eye determination information may be used. In this case, when a red eye is detected, the classification information "people" may be provided.

The automatically provided classification information is also not limited to the above-described three kinds of information "people", "landscapes", and "events" as long as a user can conveniently use the information after capturing.

Structure of Directories and Files

Figure 9:
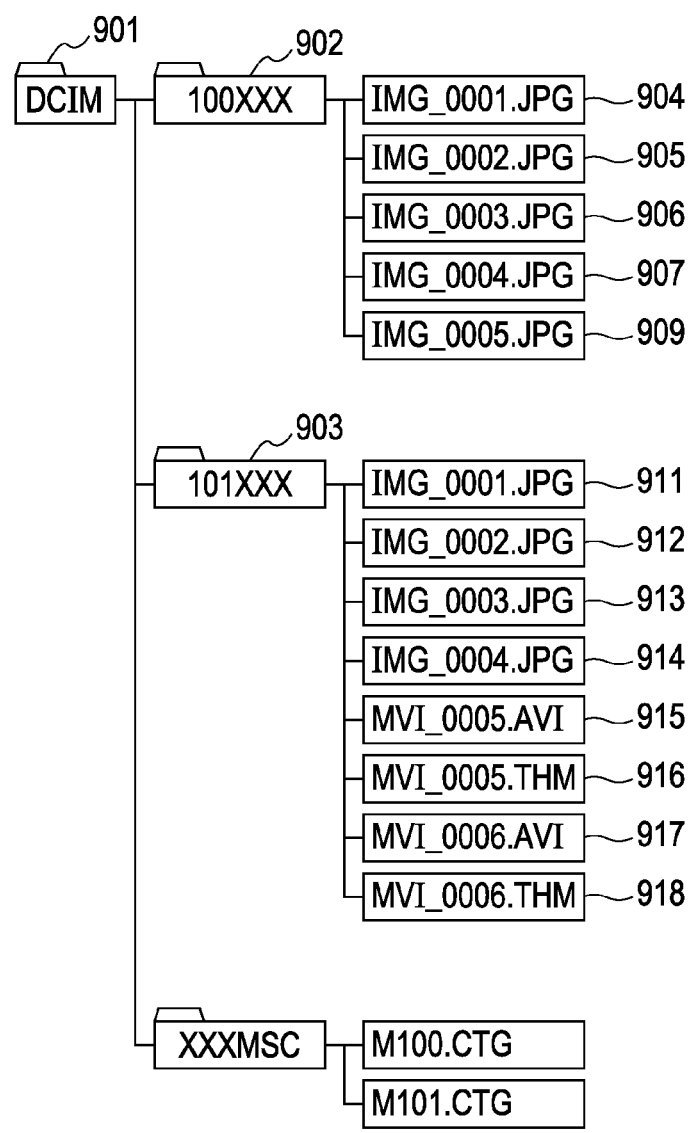
FIG. 9 illustrates an example directory and file structure.

FIG. 9 illustrates one example structure of directories and files recorded on the storage medium 200 in the above-described recording process. One example of rules for generating a directory name and a file name will now be described below with reference to FIG. 9. A DCIM directory 901 is recorded as a root directory. In the DCIM directory 901, subdirectories are generated. The name of each of the subdirectories consists of eight characters, and the first three characters are numerals. The number indicated by the first three numerals starts from 100 and is incremented by one every time a directory is generated. In FIG. 9, a subdirectory "100XXX" 902 and a subdirectory "101XXX" 903 are shown.

Files generated by the digital camera 100 are generated under the subdirectories. In the example shown in FIG. 9, files 904 to 909 generated by the digital camera 100 are generated under the subdirectory 902, and files 911 to 918 generated by the digital camera 100 are generated under the subdirectory 903. The file name generated here consists of an eight-character file name and a three-character extension indicating a file type. The last four characters of the file name consist of numerals, and the set of the four numerals starts from 0001. In the still-image recording mode, the file name is provided such that the number indicted by the last four numerals is incremented by one every time an image is captured. Hereinafter, the number indicated by the last four numerals is referred to as the file number. The extension "JPG" is supplied to a still-image file recorded in the still-image recording mode. The extension "AVI" is supplied to a moving-image file recorded in the movie recording mode. The extension "THM" is supplied to a thumbnail file that records management information.

File Structure

Figure 10:
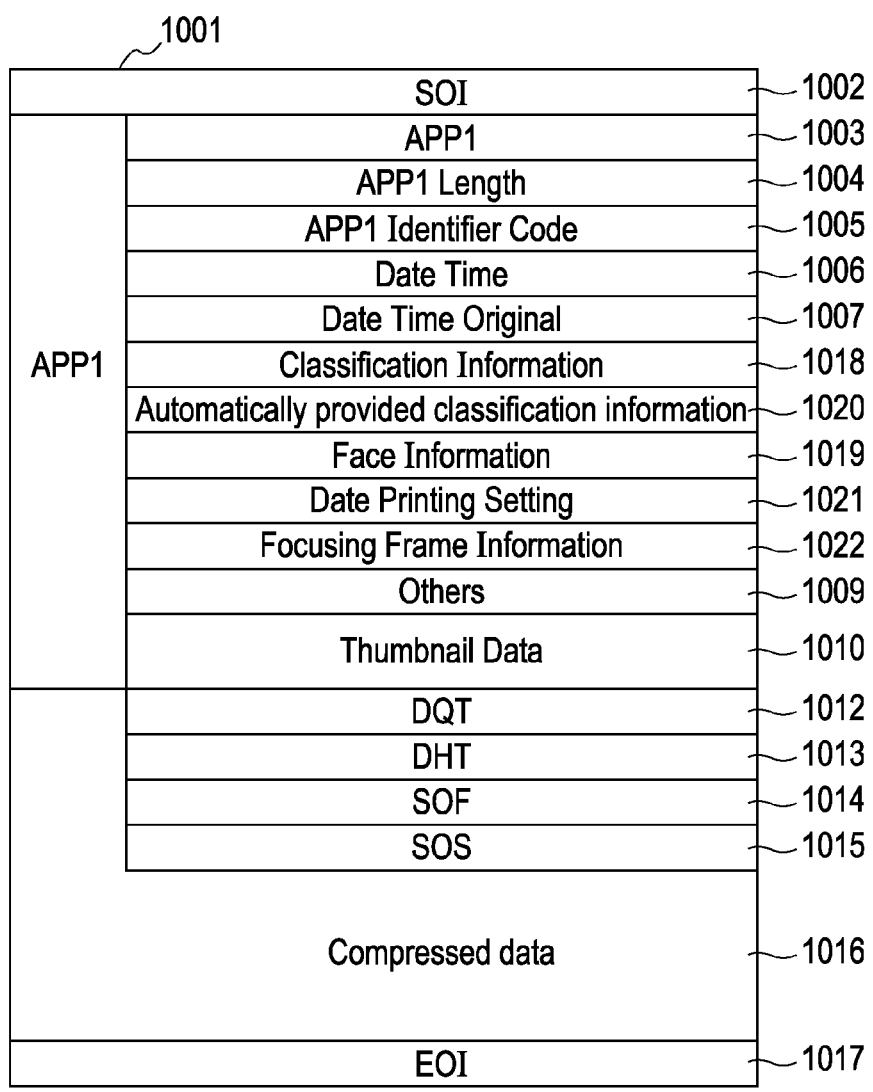
FIG. 10 illustrates an example data structure of a still-image file.

FIG. 10 illustrates an example data structure of a still-image file recorded in the recording process described above. An image file 1001 includes a start of image (SOI) marker 1002 indicating the start of the image file at the head thereof and an application marker (APP1) 1003 corresponding to a header section just at the back of the SOI 1002. The application marker (APP1) 1003 includes the following information.

size (APP1 Length) 1004
application marker identifier code (APP1 Identifier Code) 1005
creation date and time of image data (Date Time) 1006
date and time when image data was generated (Date Time Original) 1007
classification information of image data 1018
automatically provided classification information of image data 1020
date printing setting of image data 1021
focusing-frame information of image data 1022
face information 1019
other capturing information 1009
thumbnail image (Thumbnail Data) 1010

The classification information 1018 is information that is different from a parameter at the time of capturing and that is suited for post-capturing operation (e.g., searching), as previously described with reference to FIG. 8. One or more elements, such as "people", "landscapes", and "events", can be stored as the classification information 1018 at the time of capturing. In addition, general-purpose classification information, such as "category 1", "category 2", and "category 3", can also be stored. For image data to be transferred to an external device, such as a PC, through the communication portion 110, classification information for prompting for special processing (e.g., e-mail transmission at a transferring destination), such as "working", can also be stored. These kinds of classification information, which are not automatically provided in the process illustrated in FIG. 8, are provided to desired image data through a predetermined operation from a user. The predetermined operation will be described later. Classification information that is automatically provided at the time of capturing can be edited in the reproducing mode (see FIG. 15).

As described above, providing classification information for facilitating a user to carefully classify image data in the reproducing mode while viewing the image data, in addition to classification information automatically provided at the time of capturing, enables a user to classify data more conveniently.

In the present embodiment, the automatically provided classification information 1020 is set. The automatically provided classification information 1020 retains information automatically provided by the system controller 50 of the digital camera 100 according to the present embodiment. The automatically provided classification information 1020 is prohibited from being edited in the reproducing mode (see FIG. 15) and is used to identify classification information intentionally changed by a user by comparison between the classification information 1018 and the automatically provided classification information 1020.

The face information 1019 is information generated in the face detection process (step S406 of FIG. 4). The face information 1019 includes the coordinates of the position of a detected face, the size (width and height) thereof, the number of detected faces, and a reliability coefficient. These elements are included for each of detected faces.

Image data recorded in the image file 1001 includes a define quantization table (DQT) 1012, a define Huffman table (DHT) 1013, a start of frame (SOF) marker 1014, a start of scan (SOS) marker 1015, and compressed data 1016. The image file 1001 is terminated with an end of image (EOI) marker 1017 indicating the end of the image file data.

The date printing setting 1021 is a flag that indicates whether the capturing date and time is embedded in a captured image at the time of capturing. The date printing setting 1021 is used to avoid overlap of date printing when an image is printed by a printer that has the capability of date printing.

The focusing-frame information 1022 is used to manage an in-focus position and size in autofocusing (AF) at the time of capturing using a coordinate system. A user can see the in-focus position based on the focusing-frame information 1022.

Movie Recording Mode Processing

Figure 11:
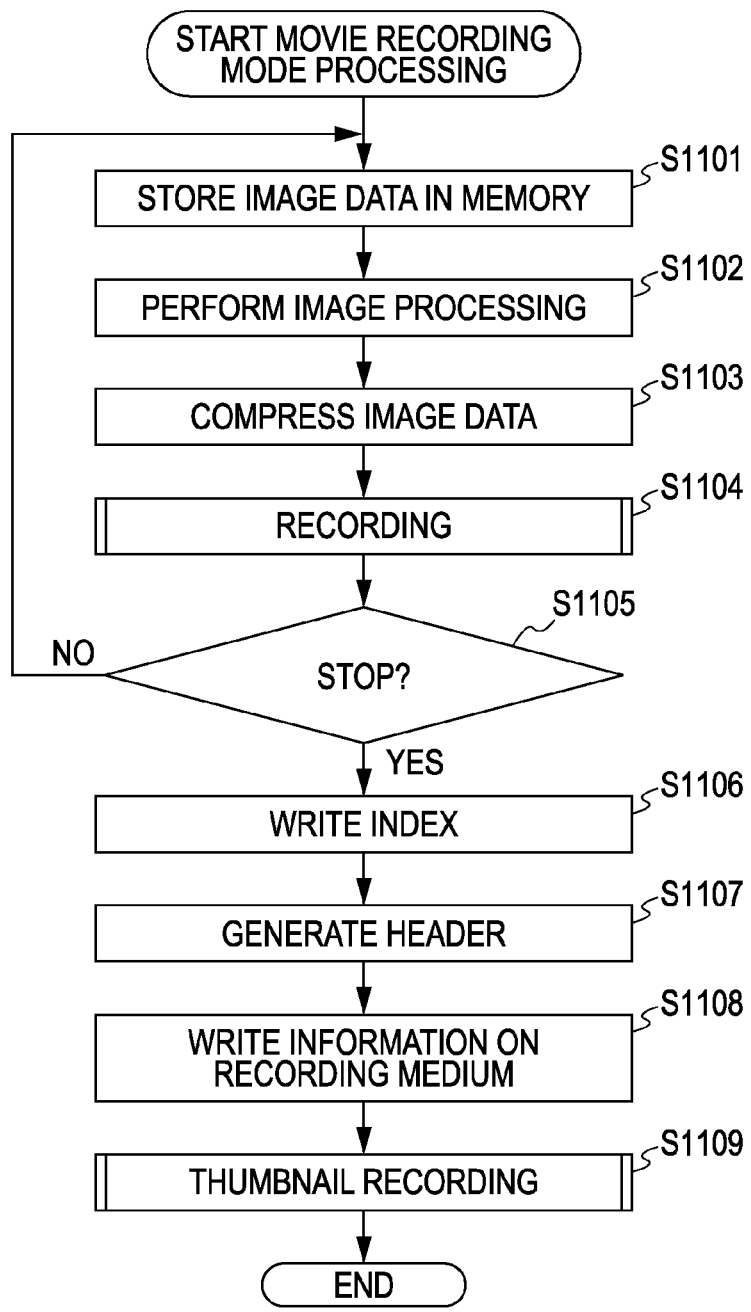
FIG. 11 is a flowchart that illustrates one example processing for movie recording mode.

FIG. 11 is a flowchart that illustrates one example process for the movie recording mode. When the mode selector 60 is set to the movie recording mode, the system controller 50 then confirms the shooting mode. In the present embodiment, the shooting mode in the movie recording mode is described, assuming that it is similar to that in the still-image recording mode. It is, of course, possible that the movie recording mode has a shooting mode specializing in movie capturing.

When the on state of the second shutter switch signal SW2 is detected in the movie recording mode, the system controller 50 starts the processing for the movie recording mode illustrated in FIG. 11. In step S1101, the system controller 50 sequentially stores image data obtained by the image pickup portion 22 in the memory 32 at a predetermined frame rate. At the same time, the system controller 50 also stores audio data obtained through the microphone 10, the audio controller 11, and the A/D converter 23 in the memory 32. In the present embodiment, the audio data is assumed to be PCM digital data.

Then, in step S1102, the system controller 50 performs image processing on the image data stored in the memory 32. One example of the image processing is resizing for recording image data in a file. Then, in step S1103, the system controller 50 compresses the image data and stores it in the memory 32.

FIG. 12 illustrates an example format for storing moving-image data recorded on the storage medium 200. A fixed-length header region 1201 is arranged at the start of data. The header region 1201 includes data of a video frame rate or audio sampling rate. A fixed-length audio data region 1202 is arranged just at the back of the header region 1201. The audio data region 1202 stores audio data in a predetermined record unit (one second in the present embodiment). The audio data is obtained by sampling of audio input to the microphone 10 into digital data through the audio controller 11 and the A/D converter 23 and is stored in the memory 32. Frame data elements (1203 to 1206) recorded at a predetermined frame rate are sequentially stored in the memory just at the back of the audio data region 1202. Similarly, data elements 1207 to 1212 indicate moving-image data for the next second, and data elements 1213 to 1217 indicate moving-image data for the Nth second. In such a way, audio data and frame data are sequentially generated and stored in a predetermined record unit, so moving-image data is generated.

When data for one second is stored in the above-described way, referring to step S1104 of FIG. 11, the system controller 50 starts recording moving-image data stored in the memory 32 on the storage medium 200 in parallel with recording moving images and audio. The system controller 50 repeats steps S1101 to S1104 until a request to stop moving-image recording is detected (step S1105). The request to stop moving-image recording is produced by redetection of the second shutter switch signal SW2, detection of insufficiency of available space of the storage medium 200, or detection of insufficiency of available space of the memory 32.

As previously described, FIG. 9 illustrates one example structure of directories and files recorded on the storage medium 200 in the above-described recording process performed in the digital camera 100. Moving-image files recorded in the movie recording mode have the extension AVI, as indicated in 915 and 917. Thumbnail files in which management information is recorded have the extension THM, as indicated in 916 and 918.

Referring back to FIG. 11, when the moving recording process is stopped in response to the request to stop moving-image recording, flow proceeds to step S1106 from step S1105. In step S1106, the system controller 50 writes moving-image data remaining in the memory 32 on the storage medium 200 and then records index information 1218 in which an offset to each of audio data and video data and the size are stored. Then, in step S1107, the system controller 50 generates header information (e.g., the number of total frames). Then, in step S1108, the system controller 50 describes the size of total data in a directory entry and records its information on the storage medium 200. In such a way, the moving-image file recording is completed. In step S1109, management information of the moving-image file is generated into a thumbnail file that has the same number as that of the above-described moving-image file and has the extension THM (e.g., MVI_0005.THM (916)). One example of the structure of a thumbnail file and the process of generating and recording the thumbnail file will be described later with reference to FIGS. 10 and 13.

Structure and Recording of Thumbnail File

A thumbnail file generated in moving-image recording has a file structure similar to that of an image file illustrated in FIG. 10. However, the thumbnail file does not have the thumbnail image region 1010 for recording thumbnail data, and a thumbnail image is recorded in the compressed data 1016.

A thumbnail file 1001 includes a start of image (SOI) marker 1002 indicating the start of the image at the head thereof and an application marker (APP1) 1003 just at the back of the SOI 1002. The application marker (APP1) 1003 includes the following information:

size (APP1 Length) 1004;
application marker identifier code (APP1 Identifier Code) 1005;
creation date and time of image data (Date Time) 1006;
date and time when image data was generated (Date Time Original) 1007;
classification information of image data 1018;
automatically provided classification information of image data 1020;
date printing setting of image data 1021;
focusing-frame information of image data 1022;
face information 1019; and
other capturing information 1009

Image data of a thumbnail file is a reduced image of the leading frame when moving-image recording starts. The image data includes a define quantization table (DQT) 1012, a define Huffman table (DHT) 1013, a start of frame (SOF) marker 1014, a start of scan (SOS) marker 1015, and compressed data 1016 corresponding to the reduced image. The image data is terminated with an end of image (EOI) marker 1017 indicating the end of the image data.

Figure 13:
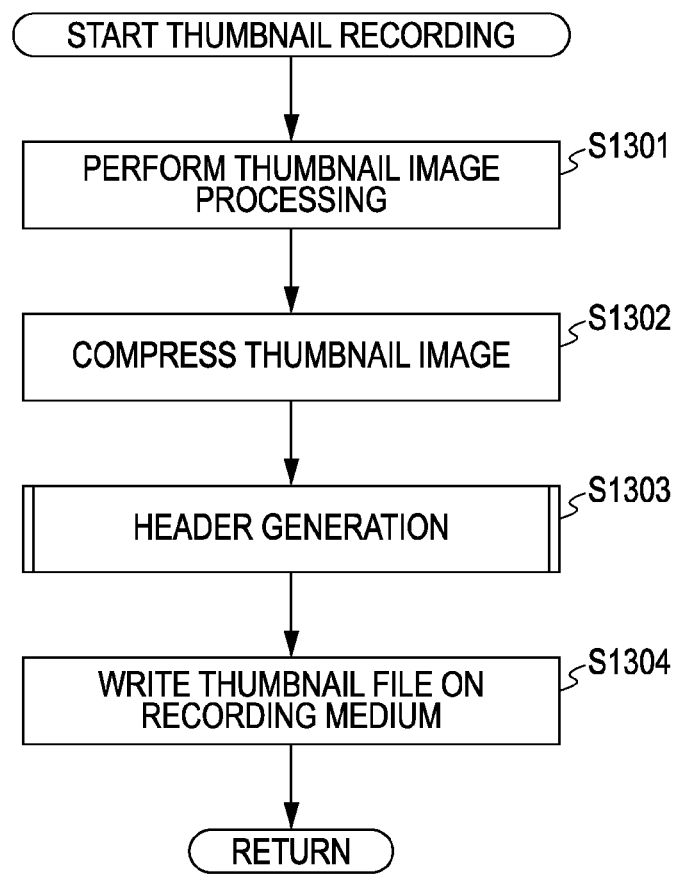
FIG. 13 is a flowchart that illustrates an example process of thumbnail file recording.

One example of the thumbnail recording process in step S1109 of FIG. 11 will now be described with reference to FIG. 13. In step S1301, the system controller 50 generates a thumbnail image. In the present embodiment, the thumbnail image is generated by image processing (e.g., resizing to a predetermined image size) performed on the leading frame of moving-image data stored in the memory 32. Then, in step S1302, the compressing/decompressing portion 16 compresses the thumbnail image generated in step S1301 under the control of the system controller 50. Then, in step S1303, a header that includes the application marker 1003 (see FIG. 10) is generated. This process is described above with reference to FIG. 8. After the completion of generation of the header, in step S1304, the system controller 50 writes a thumbnail file that includes the header and the thumbnail image data on the storage medium 200, and the thumbnail recording process is completed.

Reception Mode Processing

Figure 14:
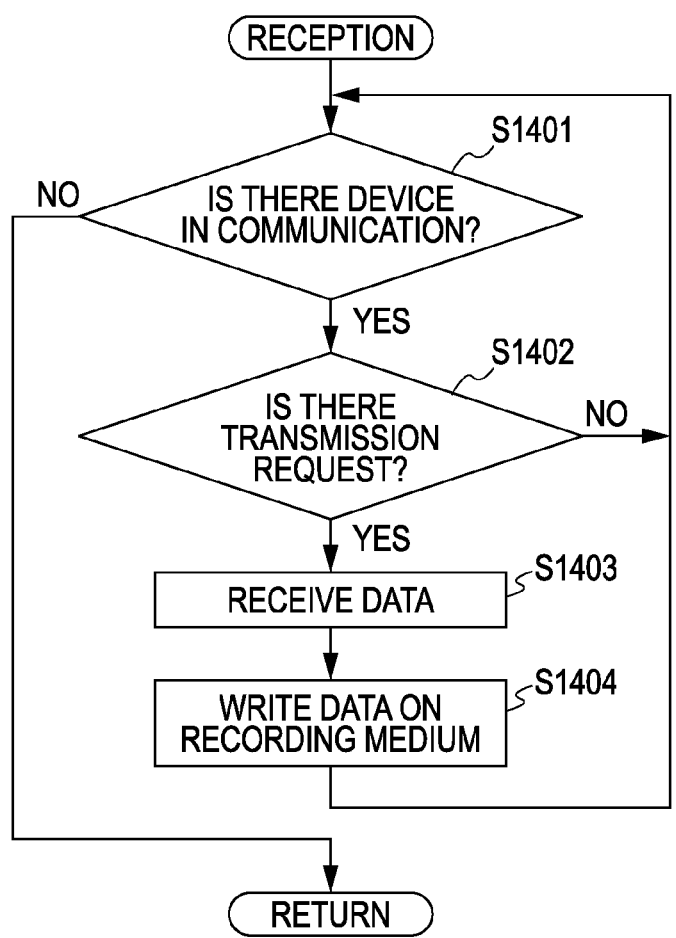
FIG. 14 is a flowchart that illustrates one example processing for reception mode.

FIG. 14 is a flowchart that illustrates one example process for the reception mode, which is one of the other modes illustrated in step S9 of FIG. 3. When the mode selector 60 of the digital camera 100 is switched to the reception mode, the processing for the reception mode illustrated in FIG. 14 is executed. In the following description, a process of receiving an image file from an external device (communication device) and recording it on a recording medium will be described.

In step S1401, the system controller 50 checks whether there is a device in communication therewith. If it is determined that no device in communication exists (NO in step S1401), this reception processing is completed. If it is determined that there is a device in communication (YES in step S1401), flow proceeds to step S1402, where the system controller 50 determines whether there is a request to transmit. If it is determined that no transmission request exists (NO in step S1402), flow returns to step S1401, and the system controller 50 checks the presence of a device in communication again and waits for a transmission request.

If it is determined that there is a transmission request (YES in step S1402), in step S1403, the system controller 50 receives data from the device in communication through the communication portion 110 and temporarily retains the received data in the memory 32. Then, in step S1404, the system controller 50 writes the received data on the storage medium 200. At this time, when the header section of the received data includes classification information, the received data is recorded on the storage medium 200 without any processing. When the header section includes no classification information, classification information may be newly provided through substantially the same process illustrated in FIG. 8. In this case, camera setting conditions at the time of capturing is obtained by referring to the header section of the received data. For example, the face information 1019 included in the header section of the received data or information on the shooting mode (scene mode) included in the other capturing information 1009 may be referred to. Subject information may be obtained by referring to the header section of the received data or may be newly detected by analysis of the received image data.

After the completion of writing, flow returns to step S1401, and the system controller 50 checks the presence of a device in communication therewith again and waits for a transmission request. If it is determined that no device in communication exists, this process exits.

Reproducing Mode Processing

Figure 15:
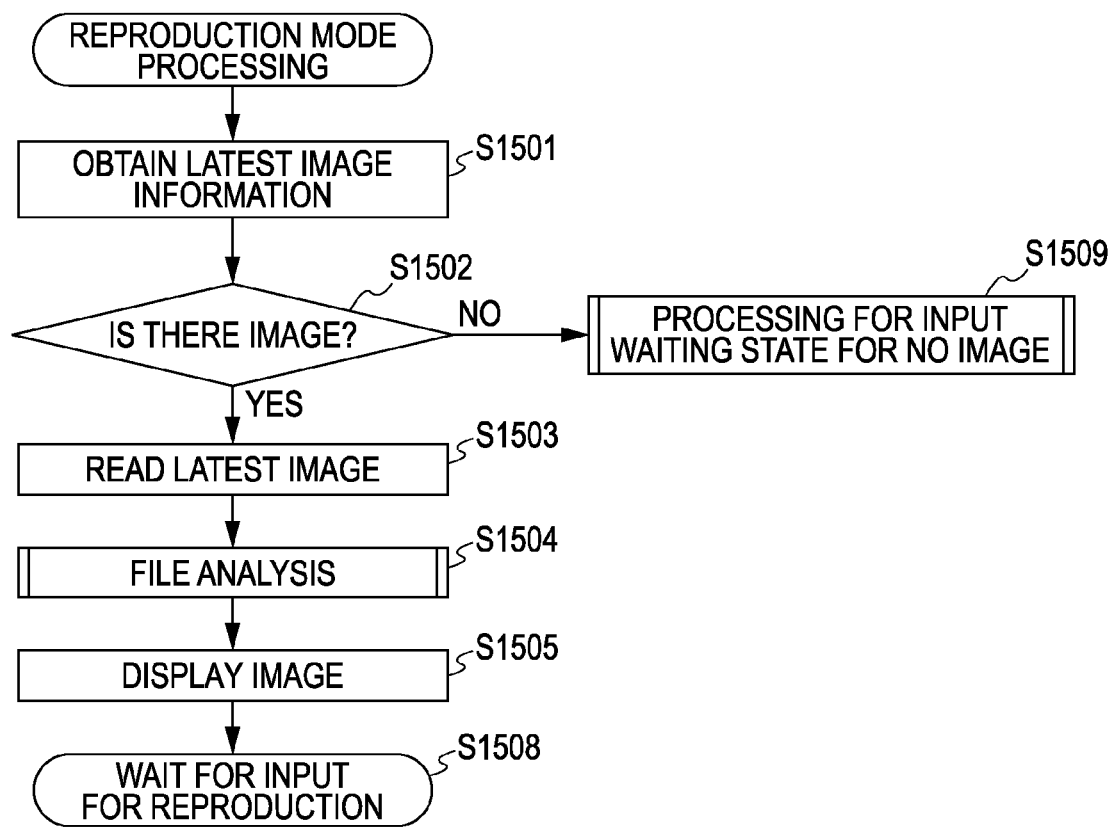
FIG. 15 is a flowchart that illustrates one example processing for reproducing mode.

FIG. 15 is a flowchart that illustrates one example process for the reproducing mode illustrated in step S8 of FIG. 3. In step S1501, the system controller 50 obtains the latest image information from the storage medium 200. The obtainment of the latest image information prior to calculation of the total number of images is advantageous in that an image for that processing can be displayed quickly after the reproducing mode starts.

Then, in step S1502, the system controller 50 determines whether the obtainment of the latest image information is successful. If it is determined that the obtainment is unsuccessful (NO in step S1502), flow proceeds to step S1509, where the system controller 50 is in an input waiting state when there is no image. One example of this process in step S1509 will be described later with reference to the flowchart of FIG. 16. One example of the situations where the obtainment of the latest image information is unsuccessful is a state in which no image exists. Another example is a state in which a defect in a medium causes a failure of the obtainment. In step S1502, when the obtainment of the latest image information is successful, it is determined that at least one image exists, so flow proceeds to step S1503.

In step S1503, the system controller 50 reads the latest image data from the storage medium 200 based on the latest image information obtained in step S1501. Then, in step S1504, the system controller 50 performs file analysis and obtains capturing information and properties information for the read latest image data. One example of this file analysis process will be described later with reference to FIG. 23. In step S1505, the system controller 50 displays the read latest image data. At this time, the system controller 50 also displays the capturing information and properties information obtained in step S1504. Depending on a result of the file analysis in step S1504, for example, when the read data is determined to be invalid due to corruption of the file, the system controller 50 also displays an error indication.

In step S1508, the system controller 50 enters an input waiting state for reproduction. One example of this input waiting state for reproduction will be described later with reference to FIGS. 17A and 17B.

Input Waiting State When There Is No Image

Figure 16:
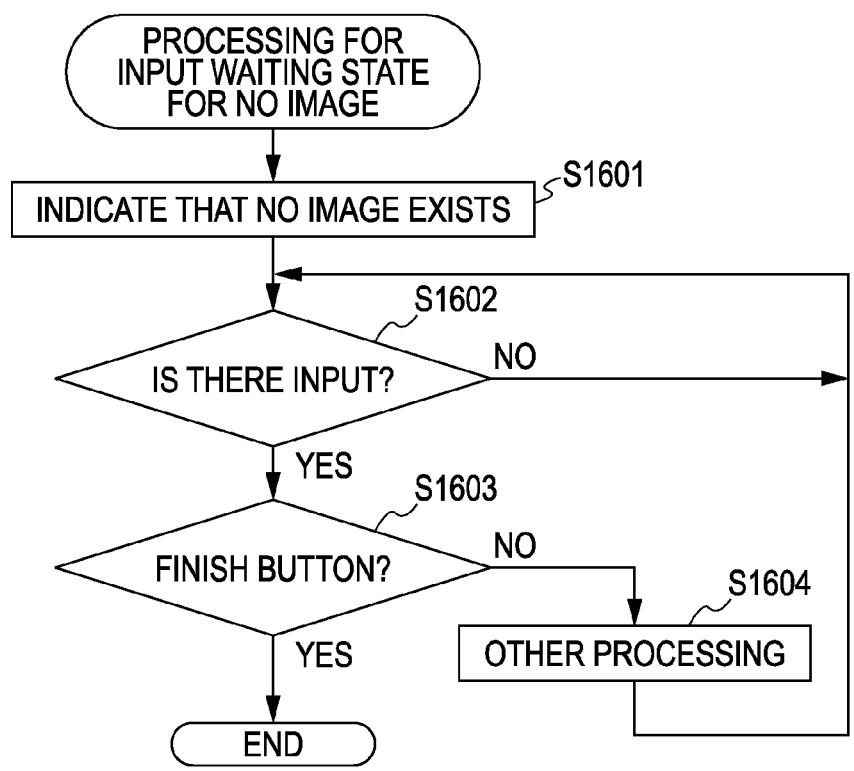
FIG. 16 is a flowchart that illustrates one example processing for an input waiting state when there is no image.

One example processing for the input waiting state when there is no image illustrated in step S1509 of FIG. 15 will now be described below with reference to FIG. 16. In step S1601, the system controller 50 displays a message saying "No Image" on the image display portion 28 to inform a user that there is no image data. Then, in step S1602, the system controller 50 waits for an input of operation. Examples of the input of operation used here include an operation to a button or a battery cover performed by a user and an event that informs low power of the power supply. If any input of operation is detected, flow proceeds to step S1603. In step S1603, the system controller 50 determines whether the input of operation is the operation to the Finish button. If the input of operation is determined to the operation to the Finish button (YES in step S1603), the processing for the reproducing mode is completed, and flow proceeds to step S10 of FIG. 3. If the input of operation is determined to be an operation other than the operation to the Finish button (NO in step S1603), flow proceeds to step S1604, where the system controller 50 performs processing for the input of operation. For example, if an operation to the Menu button is input although there is no image data, the menu is displayed on the image display portion 28, thus allowing a user to change the settings.

Input Waiting State for Reproduction

Figure 17B:
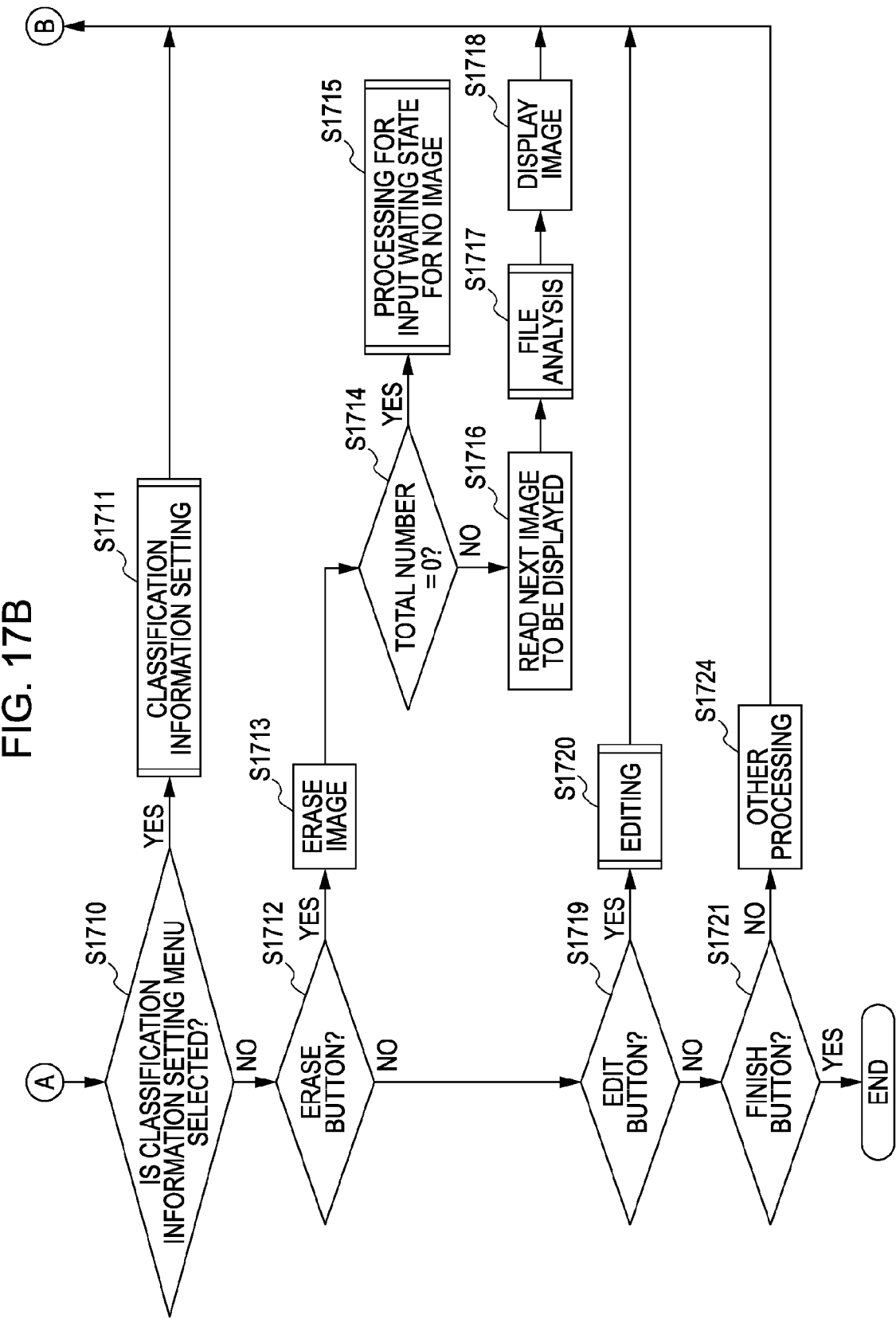

One example processing for the input waiting state for reproduction will now be described below with reference to FIGS. 17A and 17B. In step S1701, the system controller 50 determines whether there is an input of operation from a user. Examples of the input of operation used here include an operation to a button or a battery cover performed by a user and an event that informs low power of the power supply. The system controller 50 waits until any input is detected. If any input is detected, flow proceeds to step S1702.

In step S1702, the system controller 50 determines whether the detected input of operation is the operation to a retrieval key setting button included in the operation portion 70. If the input of operation is determined to the operation to the retrieval key setting button (YES in step S1702), flow proceeds to step S1703. In step S1703, the system controller 50 sets the next retrieval key and stores it in the system memory 52. The retrieval key is properties information being a unit in searching. Examples of the retrieval key include a capturing date, classification information, a folder, and a moving image. That is, when it is possible to perform searching by capturing date, classification information, folder, and moving image, a capturing date, classification information, a folder, and a moving image are sequentially selected as the retrieval key for images recorded on the storage medium 200. This sequential selection may include deselecting the retrieval key, i.e., switching to the reproducing mode for all images.

If it is determined that the input of operation is not the operation to the retrieval key setting button (NO in step S1702), flow proceeds to step S1704. In step S1704, the system controller 50 determines whether the detected input of operation is the operation to the image forward button included in the operation portion 70. If the detected input of operation is determined to the operation to the image forward button (YES in step S1704), flow proceeds to step S1705. In step S1705, the system controller 50 reads the next image to be displayed for the retrieval key set in step S1703. The image forward button consists of a pair of button sections indicating the directions in which an image to be displayed is present. In accordance with the direction corresponding to the pressed button section, the next image to be displayed is read. Then, in step S1706, the system controller 50 performs file analysis regarding capturing information and properties information on the image data read in step S1703. One example of this file analysis will be described later with reference mainly to FIG. 23. In step S1707, the system controller 50 displays the image data read in step S1705. At this time, the capturing information and properties information are displayed based on the result of the file analysis in step S1706. If the read data is determined to be invalid due to, for example, corruption of the file from the result of the file analysis in step S1706, the system controller 50 also displays an error indication. After the completion of displaying, the system controller 50 returns to the input waiting state in step S1701.

If it is determined that the detected input of operation is not the operation to the image forward button (NO in step S1704), flow proceeds to step S1709. In step S1709, the system controller 50 determines whether the calculation of the total number of images that started in step S2103 of FIG. 21 has been completed. If it is determined that it has not been completed (NO in step S1709), flow returns to step S1701, where the system controller 50 waits for an input of operation. At this time, a message or an icon that informs a user that the calculation has not been completed may be displayed. In this way, the image forwarding operation performed through the image forward button and the finishing operation performed through the finish button are executed before the completion of the calculation of the number of images. The other inputs of operation are neglected until the completion of the calculation of the number of images.

If it is determined that the calculation of the number of images has been completed (YES in step S1709), flow proceeds to step S1710. In step S1710, the system controller 50 determines whether the classification information setting menu is selected by the operation to the operation portion 70. If it is determined that the classification information setting menu is selected (YES in step S1710), flow proceeds to step S1711. In step S1711, the system controller 50 performs processing for the classification information setting mode. One example of this processing for the classification information setting mode will be described later with reference to FIG. 20.

If it is determined that the classification information setting menu is not selected (NO in step S1710), flow proceeds to step S1712. In step S1712, the system controller 50 determines whether the detected input of operation is the operation to the erase button included in the operation portion 70. If it is determined that the detected input of operation is the operation to the erase button (YES in step S1712), flow proceeds to step S1713. In step S1713, the system controller 50 erases the image data being currently displayed on the image display portion 28. Subsequently, in step S1714, the total number after the erasure is checked. If the total number is zero (YES in step S1714), flow proceeds to step S1715, where the system controller 50 returns to the input waiting state for no image. This input waiting state when there is no image is described above with reference to FIG. 16.

If image data remains after the erasure (NO in step S1716), flow proceeds to step S1716, where the system controller 50 reads image data to be displayed next in order to display the next image data. Here, the image data to be displayed next is image data that has the file number next to the file number of erased image data. If the latest image data is erased, image data that has the file number immediately previous to the file number of the erased image data. Subsequently, in step S1717, the system controller 50 performs file analysis on the image data read in step S1716 as image data to be displayed and obtains capturing information and properties information. One example of this file analysis will be described later with reference mainly to FIG. 23. In step S1718, the system controller 50 displays the image data read in step S1716 on the image display portion 28. At this time, the capturing information and properties information obtained in step S1717 are also displayed. If the read data is determined to be invalid due to, for example, corruption of the file from the result of the file analysis in step S1717, the system controller 50 also displays an error indication. After the completion of displaying, the system controller 50 returns to the input waiting state in step S1701.

If it is determined that the detected input of operation is not the operation to the erase button (NO in step S1712), flow proceeds to step S1719. In step S1719, the system controller 50 determines whether the detected input of operation is the operation to the edit button. If it is determined that the detected input of operation is the operation to the edit button (YES in step S1719), flow proceeds to step S1720, where the system controller 50 performs editing. One example of this editing will be described later with reference mainly to FIGS. 18A and 18B.

If it is determined that the detected input of operation is not the operation to the edit button (NO in step S1719), flow proceeds to step S1721. In step S1721, the system controller 50 determines whether the detected input of operation is the operation to the finish button. If it is determined that the detected input of operation is the operation to the finish button (YES in step S1721), the processing for the reproducing mode is completed, and flow proceeds to step S10 of FIG. 3.

If it is determined that the detected input of operation is not the operation to the finish button (NO in step S1721), flow proceeds to step S1724. In step S1724, the system controller 50 performs processing corresponding to the other input of operation. Examples of the processing include editing of an image, switching to multi-reproduction, and displaying the menu upon the pressing of the menu button. The multi-reproduction is the reproducing mode in which arranged thumbnail images are displayed on one screen of the image display portion 28.

Editing

Figures 18, 18A, 18B:
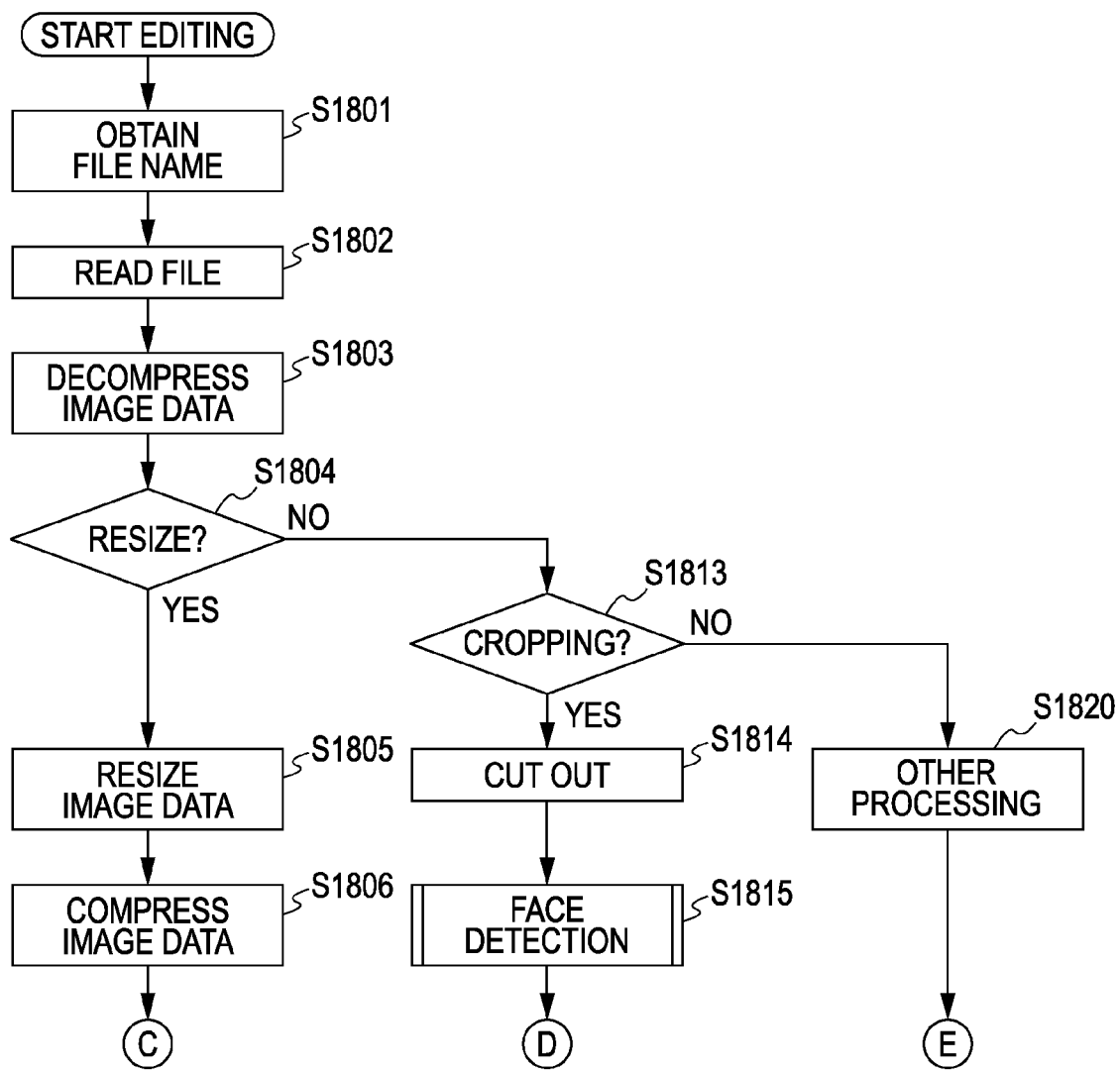
FIGS. 18A and 18B are flowcharts that illustrate an example process of editing.
Figure 18B:
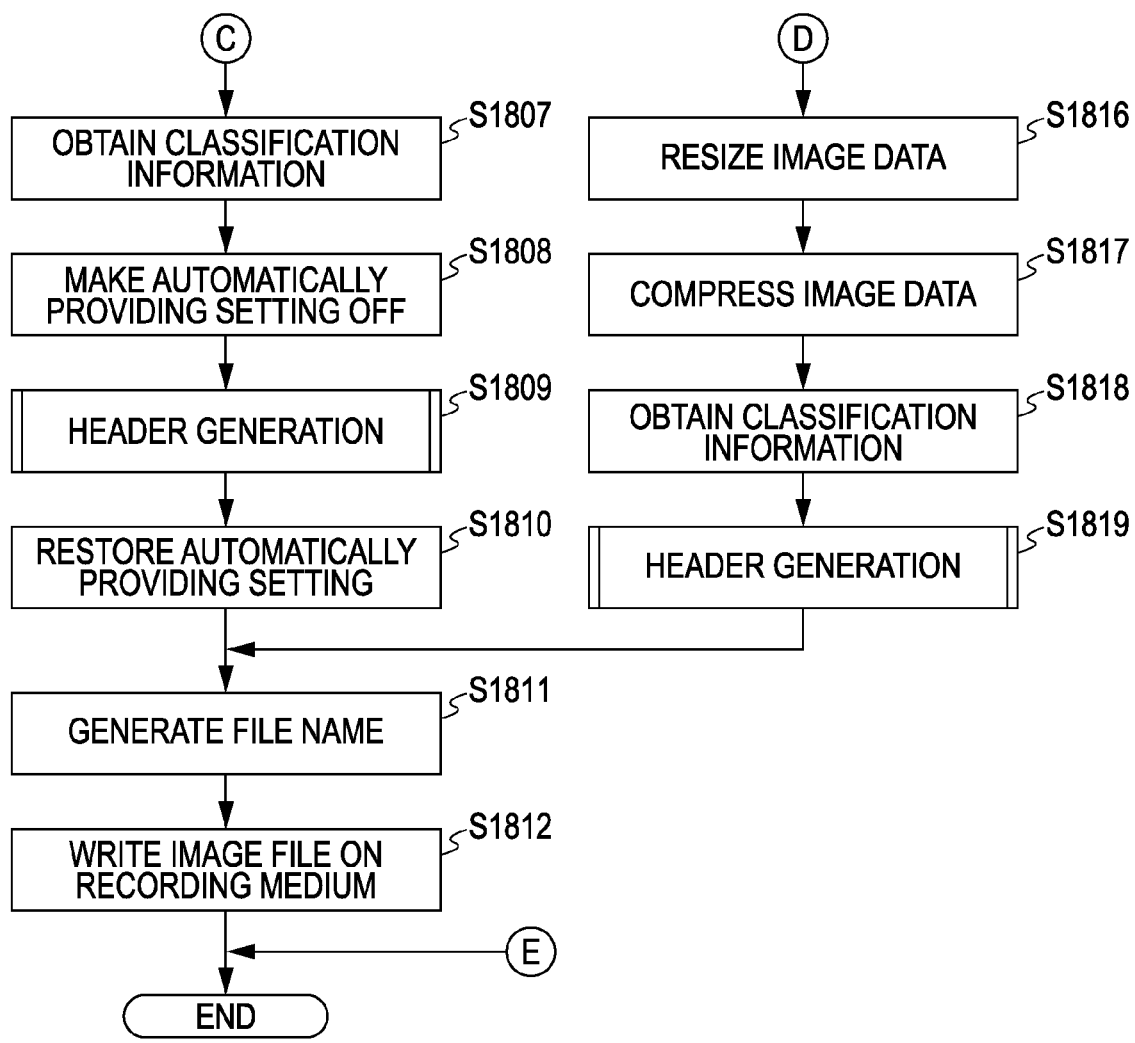

One example of the editing process in step S1720 of FIG. 17 will now be described below with reference to FIGS. 18A and 18B. One example of the executable editing processing is recording a new image file through image cutting (cropping) and image-size converting (resizing) performed on an image file displayed on the image display portion 28. This editing processing will be described below with reference to the flowchart illustrated in FIGS. 18A and 18B. In the following description, the file that has the file name IMG__0002.JPG (905) is subjected to the editing.

In step S1801, the system controller 50 obtains the image file name of the image data displayed on the image display portion 28 (IMG__0002.JPG). Then, in step S1802, the system controller 50 reads the image data corresponding to the obtained file name from the storage medium 200 into the memory 32. Then, in step S1803, the compressing/decompressing portion 16 decompresses the image data read in step S1802 under the control of the system controller 50, and the decompressed data is stored in the memory 32.

Then, in step S1804, the system controller 50 determines whether the editing to be performed is resizing. If it is determined that the editing to be performed is resizing (YES in step S1804), flow proceeds to step S1805. In step S1805, the system controller 50 enlarges or reduced the decompressed image data to a predetermined image size using the image processor 24. Then, in step S1806, the system controller 50 compresses the resized image data using the compressing/decompressing portion 16 and stores it in the memory 32. Then, in step S1807, the system controller 50 obtains classification information for the original image file read in step S1802 and stores it in the system memory 52. The use of a predetermined menu screen enables a user to specify a scaling factor in enlarging/reducing.

Then, in step S1808, the system controller 50 temporarily sets "OFF" to the set value for ON or OFF of the setting of automatically providing classification information. The original set value for ON or OFF of the setting of automatically providing classification information is recorded (saved) in a different area of the system memory 52. Then, in step S1809, the system controller 50 generates a header for edited image data. More specifically, the header section of the original image file read in the memory 32 is copied, and the header generation described with reference to FIG. 8 is performed on an image file to be newly generated using the copied header section of the original image file. Because the set value for ON or OFF of the setting of automatically providing classification information is set "OFF", classification information is not automatically provided. Because the header section is generated based on the header section of the original image file, the image file newly generated after editing inherits the classification information from the original image file. A region for the size of an image and an item, such as the creation date and time, are changed as appropriate. Then, in step S1810, the system controller 50 restores the recorded (saved) set value to the setting for ON or OFF of the setting of automatically providing classification information.

In such a way, the generation of image data for an image file to be newly generated is completed. Therefore, in step S1811, the file name of the image file to be newly generated is generated. In the present embodiment, the file name IMG_0003.JPG is generated. Then, in step S1812, the system controller 50 writes the image file generated in the above-described way on the storage medium 200, and the editing is completed.

With editing that has no change in the content of an image, such as resizing, a pre-edited image file and an edited image file have the same classification information. Therefore, inheriting classification information that is automatically provided at the time of capturing of the original image data and optionally provided by a user to edited image data enables highly convenient operation (e.g., searching) even for edited image data.

If it is determined that the editing to be performed is not resizing (NO in step S1804), flow proceeds to step S1813, where the system controller 50 determines whether the editing to be performed is cropping. If it is determined that the editing to be performed is cropping (YES in step S1813), flow proceeds to step S1814. In step S1814, the system controller 50 cuts decompressed image data down to a specific size using the image processor 24. Then, in step S1815, the system controller 50 performs face detection on the crop image, which remains after cropping. Then, in step S1816, the system controller 50 resizes (enlarges/reduces) the crop image using the image processor 24. Then, in step S1817, the system controller 50 compresses the resized image data using the compressing/decompressing portion 16, and the compressed image data is stored in the memory 32 again.

Then, in step S1818, the system controller 50 obtains classification information for the original image file read in step S1802 and stores it in the system memory 52. The use of the menu screen enables a user to specify the position to cut in cropping and a scaling factor in resizing (enlarging/reducing). Then, in step S1819, the system controller 50 generates a header for edited image data. More specifically, the header section of the original image file read in the memory 32 is copied, and the header generation described with reference to FIG. 8 is performed on an image file to be newly generated using the copied header section of the original image file. If the setting of automatically providing classification information is "ON", classification information is automatically provided based on the face information detected in step S1815. A region for the size of an image and an item, such as the creation date and time, are changed as appropriate.

In such a way, the generation of image data for an image file to be newly generated is completed. In step S1811, the file name of the image file to be newly generated is generated. In the present embodiment, the file name IMG_0003.JPG is generated. Then, in step S1812, the system controller 50 writes the image file generated in the above-described way on the storage medium 200, and the editing is completed.

For editing that involves changing the content of an image, such as cropping, classification information is provided again based on an edited image. Therefore, highly convenient operation (e.g., searching) can be made even for edited image data.

If it is determined that the editing to be performed is cropping (NO in step S1813), flow proceeds to step S1820, where the system controller 50 performs the other processing. Examples of the other processing include color transform of an image, altering the shape of an image, and combining. Even in these cases, image analysis corresponding to the editing may be conducted, and the header generation is also performed. The process illustrated in FIG. 18 corresponds to an example process performed by an editing unit and a re-providing unit.

Figure 19A:
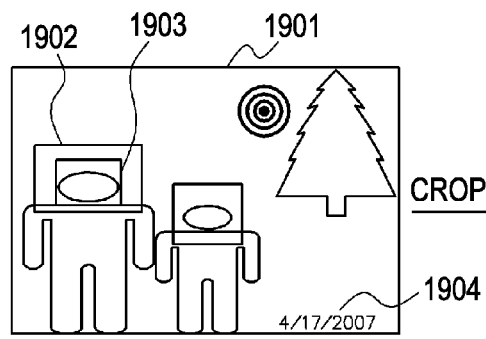
FIGS. 19A to 19D are illustrations for describing a specific example of a cropping process.

One specific example of the cropping will now be described with reference to FIGS. 19A to 19D. In FIG. 19A, reference numeral 1901 represents a pre-crop image. Reference numeral 1902 represents a crop specified area to be cropped by an operation from a user. Reference numeral 1903 represents a face-detection focusing frame at the time of capturing. Reference numeral 1904 represents information appearing when the date printing setting is active, and indicates the capturing date. The pre-crop image 1901 has the properties "Tag (classification information): people; No. of people: 2; Date printing: ON; Face coordinates 1: left middle, 10×10; and Face coordinates 2: middle, 10×10."

Figure 19B:
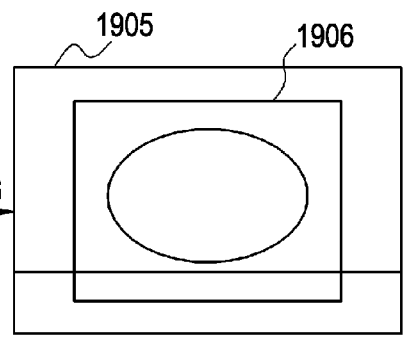

FIG. 19B illustrates a crop image 1905, which remains after the cropping is performed using the crop specified area 1902. From the flowchart of FIGS. 18A and 18B, the properties of the crop image 1905 are "Tag (classification information): people; No. of people: 1; Date printing: OFF; Face coordinates 1: middle, 90×90; and Face coordinates 2: none." The changed properties information enables proper information displaying and searching in reproducing an image. For example, as illustrated in a face-detection focusing frame 1906, even after cropping, which part a face is identified in a subject and where a focusing frame is determined can be displayed.

Figure 19C:
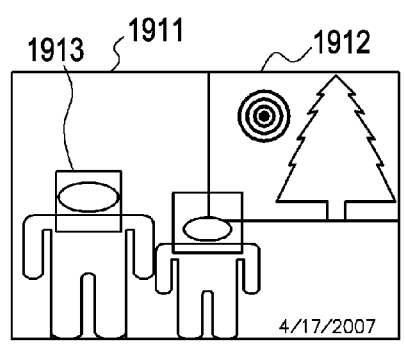

In FIG. 19C, reference numeral represents a pre-crop image 1911. Reference numeral 1912 represents a crop specified area to be cropped by an operation from a user. Reference numeral 1913 represents a face-detection focusing frame at the time of capturing. The pre-crop image 1911 has the properties "Tag (classification information): people; No. of people: 2; Date printing: ON; Face coordinates 1: left middle, 10×10; and Face coordinates 2: middle, 10×10."

Figure 19D:
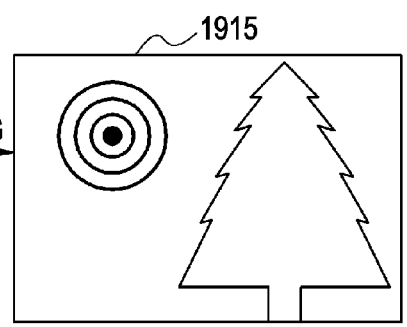

FIG. 19D illustrates a crop image 1915 remaining after the cropping is performed using the crop specified area 1912. From the flowchart of FIGS. 18A and 18B, the properties of the crop image 1915 are "Tag (classification information): landscapes; No. of people: 0; Date printing: OFF; Face coordinates 1: none; and Face coordinates 2: none." The changed properties information enables proper information displaying and searching in reproducing an image. For example, the pre-crop image 1911 has the properties "Tag: people", whereas the crop image 1915 has the properties "Tag: landscapes", from the process described with reference to FIGS.

18A and 18B. Accordingly, the crop image 1915, in which people is not captured, will not be retrieved with the retrieval key "people", and the crop image 1915 can be retrieved with the retrieval key "landscapes."

Both the crop images 1905 and 1915 have the properties "Date printing: OFF" changed from the respective pre-crop images. For example, when a printer that has the capability of adding and printing the date at the time of printing is used, in the case of printing an image in which the date has been embedded, such as the pre-crop images 1901 and 1911, if "Date printing: ON" is set, the printer may suppress printing of the date in order to avoid overlapping of printing of the date information. When the date printed part is excluded from an image, as in the crop images 1905 and 1915, changing the properties to "Date printing: OFF" allows the printer side to add and print the date properly.

Processing for Classification Information Setting Mode

As described with reference to FIGS. 17A and 17B, in the digital camera 100 according to the present embodiment, the processing for the classification information setting mode is executed by selection of the information setting menu. FIG. 20 is a flowchart that illustrates one example processing for the classification information setting mode.

In step S2001, the system controller 50 determines whether there is an input of operation from a user. Examples of the input of operation used here include an operation to a button or a battery cover performed by a user and an event that informs low power of the power supply. The system controller 50 waits until any input is detected.

If it is determined that the detected input of operation is the finish operation that instructs finishing of setting classification information (YES in step S2002), flow proceeds to step S2003. In the present embodiment, examples of the finishing operation instructs finishing of setting classification information here include an operation to the menu button of the operation portion 70 for exiting from the classification information setting, an operation for switching off the power supply, and an operation of changing the mode from the reproducing mode to the shooting mode. In step S2003, the system controller 50 writes classification information of image data changed in step S2011, which will be described later, to the image file. Then, the classification information setting mode is completed. The processing returns to the input waiting state in S1701 of FIG. 17.

If it is determined that the detected input of operation is the operation to the image forward button included in the operation portion 70 (YES in step S2005), flow proceeds to step S2005 to step S2006. In step S2006, the system controller 50 writes classification information of image data changed in step S2011, which will be described later, to the image file. Then, in step S2007, the system controller 50 reads image data to be displayed next. Then, the image forward button consists of a pair of button sections (rightward and leftward directions in the present embodiment). Image data displayed next is changed depending on the selected direction.

Then, in step S2008, the system controller 50 performs file analysis on the image data read in step S2007 and obtains properties information from the file. One example of this file analysis will be described later with reference mainly to FIG. 23. In step S2009, the system controller 50 displays the read image data on the image display portion 28. At this time, the capturing information and properties information (e.g., classification information) are displayed, depending on the settings. If the read data is determined to be invalid due to, for example, corruption of the file from the result of the file analysis in step S2008, the system controller 50 also displays an error indication. After the completion of displaying, the system controller 50 returns to step S2001 and enters the input waiting state.

The image forwarding operation described in steps S2005 to S2009 is applicable to both single reproduction, in which a single image is displayed in a single screen, and multi-image reproduction (also called multi-image display), in which a plurality of images (e.g., nine images) are displayed in a single screen. In the case of the multi-image display, the cursor is continuously moved in response to an instruction to image forwarding, and classification information for the image data is written to the image file in response to this instruction to move.

If it is determined that the input of operation detected in step S2001 is the classification information changing operation (YES in step S2010), flow proceeds to step S2011 from step S2010. In step S2011, the system controller 50 changes the classification information for the displayed image data. At this stage, the change in the classification information is not written to the image file, but the change is stored in the memory 32. Then, in step S2012, the system controller 50 reflects the changed classification information to the display on the image display portion 28.

If it is determined that the input of operation detected in step S2001 is not any one of the above operations (NO in step S2010), flow proceeds to step S2013, where the other processing is performed. Examples of the other processing include switching between the signal reproduction to the multi-image display.

As described above, classification information is written to an image file at the time switching of the display of image data is switched or at the time of completion of the classification information setting mode. This can reduce the count of access to the storage medium 200 and can improve the operating speed.

File Management

Figure 21:
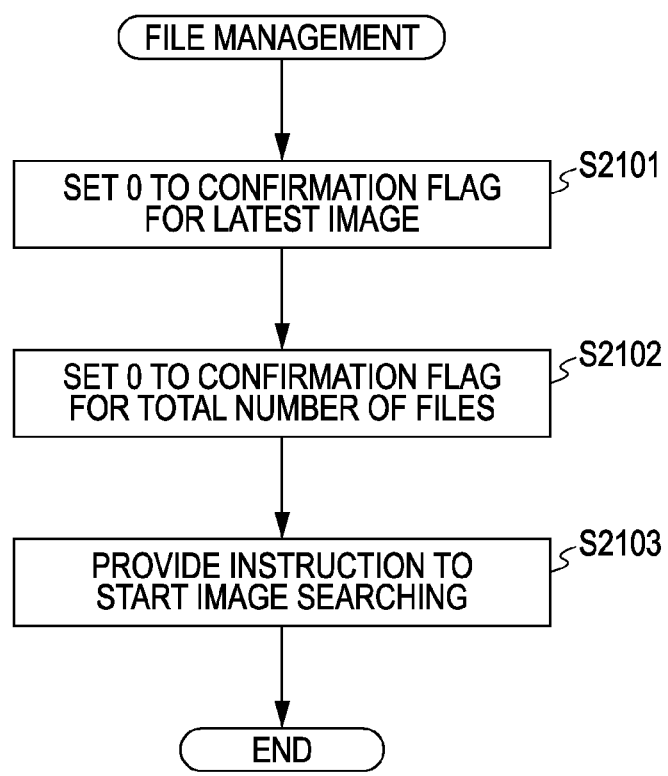
FIG. 21 is a flowchart that illustrates an example process of image file management.

FIG. 21 is a flowchart that illustrates one example of the image file management process in step S2 of FIG. 3. In step S2101, the system controller 50 clears the confirmation flag for the latest image recorded in the system memory 52. In step S2102, the system controller 50 clears the confirmation flag for the total number of files. In step S2103, the system controller 50 provides image searching performed in parallel with the above processing with an instruction to start image searching. Then, the present processing is completed.

Image Searching

Figure 22:
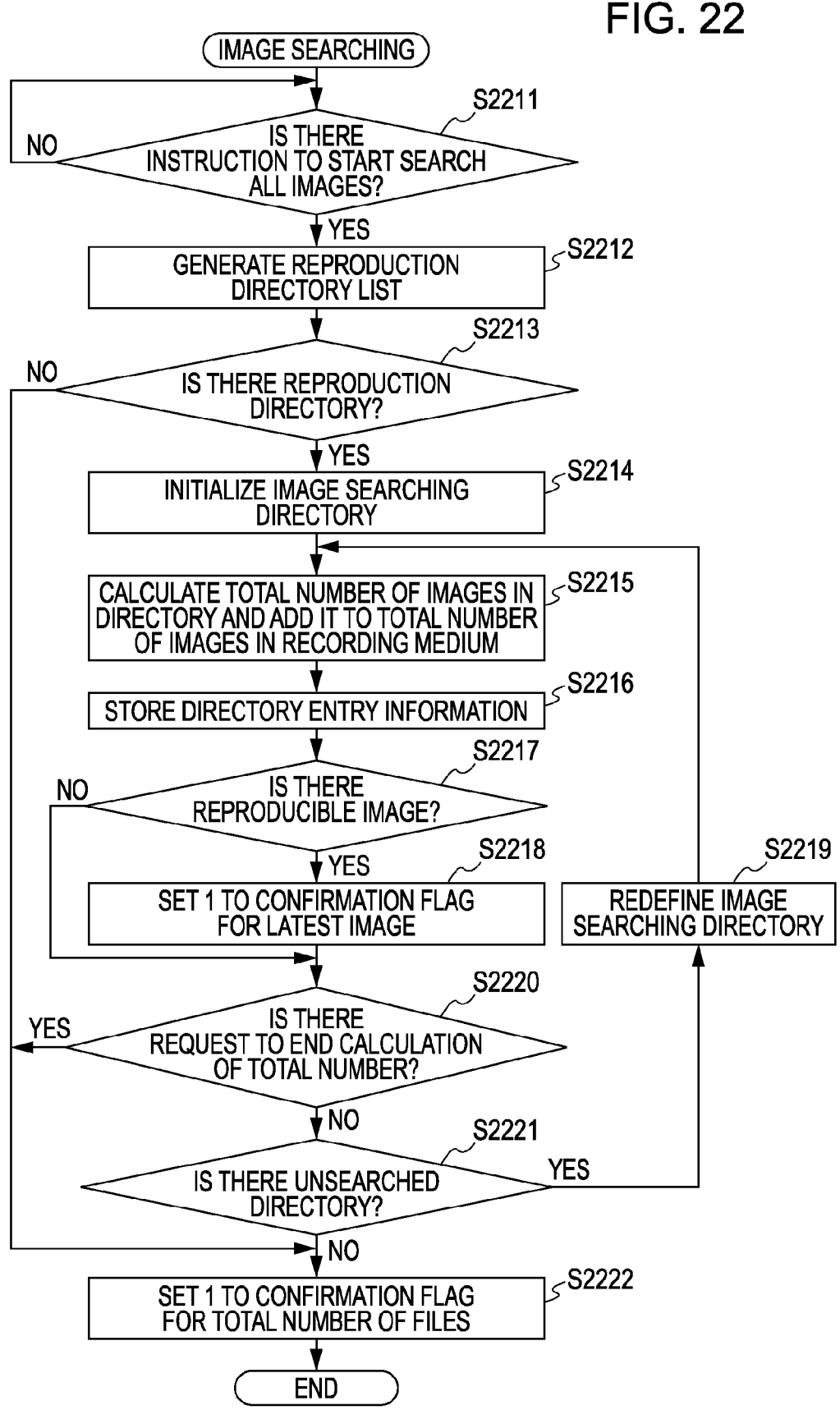
FIG. 22 is a flowchart that illustrates an example process of image searching.

FIG. 22 is a flowchart that illustrates one example of the image searching process performed in response to an instruction to start image searching provided in step S2103 of FIG. 20. When the instruction to start image searching, flow proceeds to step S2212 from step S2211. In step S2212, the system controller 50 generates a reproduction directory list. This is the processing of, in the case of, for example, a reproducing apparatus following the DCF standards, analyzing a directory entry of a DCF root directory, searching for the DCF directory, and adding it to the reproduction directory list.

Then, in step S2213, the system controller 50 determines whether the reproduction directory is present. If it is determined that the reproduction directory is not present, i.e., a directory or file that can be handled by the digital camera 100 is absent (NO in step S2213), the system controller 50 sets zero to the total number of files. After that, in step S2222, the system controller 50 sets one to the confirmation flag for the total number of files, and the present processing is completed.

If it is determined that the reproduction directory is present (YES in step S2213), the system controller 50 initializes an image searching directory in step S2214. For a reproducing apparatus following the DCF standards, for example, the DCF directory that has the maximum number is set to the image searching directory. Then, in step S2215, the system controller 50 calculates the total number of images in the directory set as a target of the image searching by analyzing a directory entry of this directory. The calculated total number of images in the directory is added to the total number of images in the storage medium 200.

In step S2216, the system controller 50 obtains information described in the directory entry of the DCF root directory. Specifically, the minimum file number, the maximum file number, the sum of file numbers, the sum of time stamps, the sum of sizes of files, the total number of files, and other items are obtained. These items are stored in the system memory 52 as directory entry information.

Then, in step S2217, the system controller 50 determines whether there is a reproduction image file, i.e., a file that can be handled by the digital camera 100. If it is determined that there is a reproduction image file (YES in step S2217), flow proceeds to step S2218, where the system controller 50 determines the latest image and sets one to the confirmation flag for the latest image.

If there is an instruction to end calculation of the total number provided by operation to the finish button (YES in step S2220), flow proceeds to step S2222, and the processing exits. If there is no instruction to end calculation of the total number provided by operation to the finish button (NO in step S2220), the system controller 50 determines whether there is an unsearched directory in step S2221. If it is determined that there is an unsearched directory (YES in step S2221), flow proceeds to step S2219. In step S2219, the unsearched directory is set to the image searching directory, and flow returns to step S2215. In such a way, the processing of steps S2215 to S2218 are performed on all directories in the reproduction directory list generated in step S2212. After the completion of performance of the processing of steps S2215 to S2218 on all directories, flow proceeds to step S2222. In step S2222, the system controller 50 informs the confirmation of the latest image, calculates the total number of images, and sets the confirmation flag for the total number of files, and the processing exits.

Even when there is a reproduction directory, if there is no reproduction image in the directory, which means that the total number of images is zero, the confirmation flag for the total number of files is set, and the processing exits.

File Analysis

Figure 23:
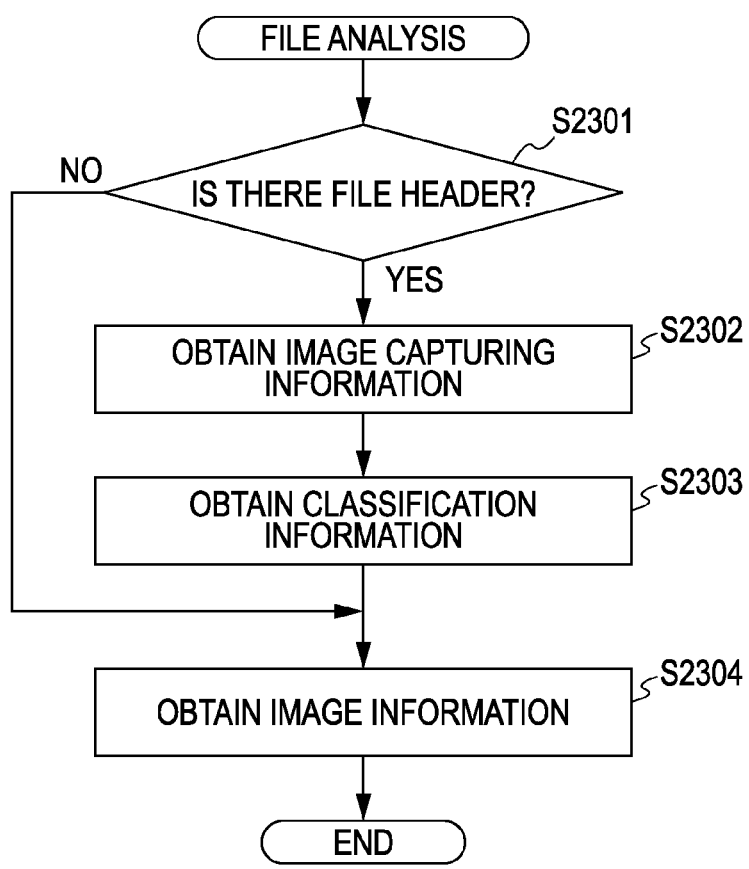
FIG. 23 is a flowchart that illustrates an example process of file analysis.

One example of the file analysis process in step S1504 in FIG. 15, steps S1704 and S1717 in FIGS. 17A and 17B, step S2008 in FIG. 20 will now be described with reference to FIG. 23. In step S2301, the system controller 50 determines whether a file being a target of the analysis has a file header in which the capturing information and properties information (e.g., classification information) are described. If it is determined that the file has such a file header (YES in step S2301), the system controller 50 obtains the capturing information from the file header in step S2302 and obtains classification information from the file header in step S2303. In step S2304, the system controller 50 obtains information on the body of the image data, for example, the start position of the body of the image and the method for compressing an image.

As described above, according to the present embodiment, when an image is edited, classification information is re-provided to an edited image. Accordingly, proper classification information can be provided to an edited image.

Second Embodiment

A second embodiment is described below with reference to the accompanying drawings.

One major point of the differences to the first embodiment is that, in the present embodiment, capturing information, such as focusing frame and capturing date, is provided to an image in addition to classification information, whereas in the first embodiment classification information is provided to an image. The following description focuses on this point.

The detailed description of parts shared by the first embodiment, such as the structure of the digital camera, capturing, recording, reproducing, processing in each mode, and the structure of a file, is omitted.

Header Generation

Figure 24:
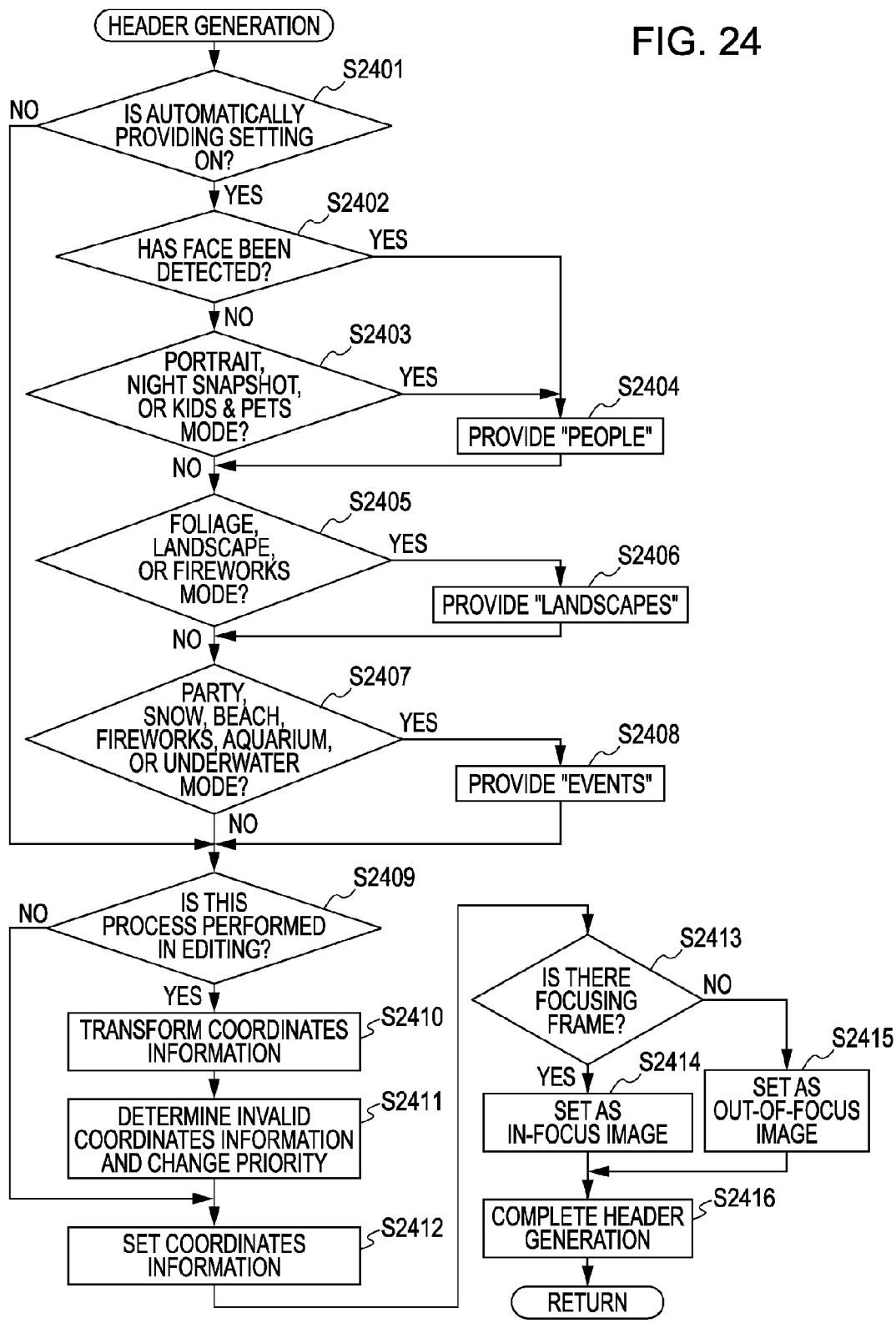
FIG. 24 is a flowchart that illustrates an example process of header generation according to a second embodiment.

Another example of the header generation process in step S706 of FIG. 7 will now be described with reference to FIG. 24.

In step S2401, the system controller 50 obtains the set value for ON or OFF of the setting of automatically providing classification information specified in step S405 of FIG. 4 from the system memory 52 and determines whether classification information is to be automatically provided to captured image data. If it is determined that "OFF" is set to the set value for ON or OFF of the setting of automatically providing classification information, i.e., classification information is not to be automatically provided (NO in step S2401), flow proceeds to step S2409.

If it is determined that "ON" is set to the set value for ON or OFF of the setting of automatically providing classification information, i.e., classification information is to be automatically provided (YES in step S2401), flow proceeds to step S2402. In step S2402, the system controller 50 reads the face information retained in the system memory 52 in step S406 of FIG. 4 and determines whether a face has been detected. If it is determined that a face has been detected (YES in step S2402), flow proceeds to step S2404, where classification information of "people" is provided. If it is determined that no face has been detected (NO in step S2402), flow proceeds to step S2403.

In step S2403, the system controller 50 refers to the scene mode of the image at the time of capturing stored in the system memory 52 and determines whether the scene mode is any one of "Portrait mode", "Night snapshot mode", and "Kids & Pets mode." If it is determined that the scene mode is any one of them (YES in step S2403), flow proceeds to step S2404, where the system controller 50 provides the image data with the classification information of "people." If the classification information of "people" is provided in step S2404 or if it is determined that the scene mode is not any one of them (NO in step S2403), flow proceeds to step S2405.

As described above, in steps S2402 to S2404, from both the face information, which is one example of subject information, and the scene mode, which is one example of camera setting conditions at the time of capturing, the same classification information of "people" is provided. The subject information and the camera setting conditions at the time of capturing are different parameters at the time of capturing, but they may have a similar post-capturing meaning depending on the contents. Both the face information, which is one of the subject information, and the modes of "Portrait mode", "Night snapshot mode", and "Kids & Pets mode", which are one of the camera setting conditions at the time of capturing, have the same meaning that "it is presumed that a person has been captured." Accordingly, providing image data having such information with the same classification information enhances convenience in post-capturing operation (e.g., searching operation). That is, providing the same classification information using both specific subject information and specific camera setting conditions enables provision of classification information that is different from a parameter at the time of capturing and that is suited for post-capturing operation (e.g., searching operation). This can enhance convenience.

Additionally, the above-described classification information providing process can provide the same classification information for different scene modes of the Portrait mode, Night snapshot mode, and Kids & Pets mode. Different scene modes have different camera setting conditions at the time of capturing, but they may have a similar meaning. All of the Portrait mode, Night snapshot mode, and Kids & Pets mode have the same meaning that "it is presumed that a person has been captured." Accordingly, providing such image data with the same classification information enhances convenience in post-capturing operation (e.g., searching operation). That is, providing the same classification information for a plurality of kinds of specific setting conditions among the camera setting conditions at the time of capturing enables provision of classification information that is different from a parameter at the time of capturing and that is suited for post-capturing operation (e.g., searching operation). This can enhance convenience in post-capturing operation.

Referring back to FIG. 24, in step S2405, the system controller 50 determines whether the scene mode is any one of "Foliage mode", "Landscape mode", and "Fireworks mode." If it is determined that the scene mode is any one of them (YES in step S2405), flow proceeds to step S2406, where the system controller 50 provides the image data with the classification information of "landscapes." If the classification information of "landscapes" is provided in step S2406 or if it is determined that the scene mode is not any one of them (NO in step S2405), flow proceeds to step S2407.

In step S2407, the system controller 50 determines whether the scene mode is any one of "Party mode", "Snow mode", "Beach mode", "Fireworks mode", "Aquarium mode", and "Underwater mode." In these modes, it is presumed that an event is captured. If it is determined that the scene mode is any one of them (YES in step S2407), flow proceeds to step S2408, where the system controller 50 provides the image data with the classification information of "events."

In the above-described process, two kinds of information "landscapes" and "events" are provided image data captured in the "Fireworks mode." That is, a plurality of kinds of information is provided from a single scene mode. Even in the same camera setting conditions at the time of capturing (scene mode), captured image data may have a plurality of meanings. One such example is an image captured in the "Fireworks mode." In such a case, the system controller 50 provides a plurality of kinds of classification information corresponding to post-capturing meanings. Therefore, classification information that is different from a parameter at the time of capturing and that is suited for post-capturing operation (e.g., searching operation) can be provided. This can enhance convenience in post-capturing operation in the digital camera 100.

In the case of "Automatic mode", "Manual mode", or other modes, which are determined to be NO in all of steps S2403, S2405, and S2407, no classification information is provided.

After the completion of the process of providing classification information in a header, flow proceeds to step S2409.

In step S2409, if the system controller 50 determines that this header generation is performed in editing generates header information using classification information, flow proceeds to step S2410.

In step S2410, coordinates information described in the pre-edited header is transformed. Here, the coordinates information is information that has the position on the image and the area of the face, such as face information and focusing frame information. In editing that involves changing of an angle of field, for example, in the case of cutting, such as cropping, or combining, coordinates information for a pre-edited image is improper for an edited image. To address this, in the case of cropping, the coordinates information is transformed for an edited image based on the position of a cut portion and the size of the cut portion.

Then, in step S2411, invalid coordinates information is determined and priority is changed. The determination of invalid coordinates information is made by determining whether the transformed position and the coordinates of an area in step S2410 are included in the edited image. Examples of the conditions for determining the invalid coordinates information include, for example, the transformed position and the coordinates of the area partly extend from the edited image, they entirely extend therefrom, and the center of the area of the transformed coordinates extends therefrom.

If the degree of focusing at the time of capturing has a priority, such as focusing-frame information, the priority is re-set. For example, when the main focusing frame is determined to be invalid coordinates information, focusing that has the next priority is re-set as the main focusing. When there is no focusing that has the next priority after the main focusing frame is determined to be invalid coordinates information, the image has no focusing-frame coordinates.

Then, in step S2412, the coordinates information is set in the header. This is the coordinates information after the transform in editing described in steps S2410 and S2411 or the coordinates information at the time of capturing when it is determined that the processing is not performed in editing in step S2409.

Then, in step S2413, the presence of the focusing-frame coordinates is determined. The focusing-frame coordinates here is the coordinates in the captured image for the processing at the time of capturing or the focusing-frame coordinates retained in step S2412 when the process is performed in editing. If it is determined that there is a focusing frame (YES in step S2413), it is set as an in-focus image in the header in step S2413. If it is determined that there is no focusing-frame coordinates (NO in step S2413), it is set as an out-of-focus image in the header in step S2415.

Then, in step S2416, the system controller 50 generates header information using the classification information, the set values (e.g., information on the capturing date and time). The classification information changed by a user may not be updated.

This can be achieved by, for example, not reflecting detection of classification information in this process from the determination that the preceding classification information different from the preceding automatically provided classification information already described in the header is classification information that has been changed by a user.

For example, when the automatically provided classification information "landscapes" has been already set and "landscapes" and "people" are set to classification information, it is determined that "people" is set by a user, so the property "people" is not changed regardless of a result of automatic provision.

When a current result of automatic provision differs from the content of classification information described in the header, a user may be asked to select properties to be provided on a GUI.

When a flag for enabling date printing on an image is set, the flag is cleared. The flag for date printing may be changed only when it is determined that printed date is not included in a crop area. Referring back to FIG. 24, when the set value for ON or OFF of the setting of automatically providing classification information is determined to be off (NO in step S2401), the setting of classification information (steps S2402 to S2408) is skipped, so header information that has no classification information is generated.

As described above, when an image is edited, the coordinates information (e.g., in-focus information) is transformed to the coordinates position in an edited image, and then validness/invalidness is determined. Accordingly, an image that loses focusing-frame information as one of the properties is determined as an out-of-focus image, so proper properties can be provided.

Cropping

Cropping according to the second embodiment will be described below.

In step S1804, the system controller 50 determines whether the editing to be performed is resizing. If it is determined that the editing to be performed is not resizing (NO in step S1804), flow proceeds to step S1813. In step S1813, the system controller 50 determines whether the editing to be performed is cropping. If it is determined that the editing to be performed is cropping (YES in step S1813), flow proceeds to step S1814.

In step S1814, the system controller 50 cuts decompressed image data down to a specific size using the image processor 24. Then, in step S1815, the system controller 50 performs face detection on the crop image, which remains after cropping. Then, in step S1816, the system controller 50 resizes (enlarges/reduces) the crop image using the image processor 24. Then, in step S1817, the system controller 50 compresses the resized image data using the compressing/decompressing portion 16, and the compressed image data is stored in the memory 32 again.

Then, in step S1818, the system controller 50 obtains classification information for the original image file read in step S1802 and stores it in the system memory 52. The use of the menu screen enables a user to specify the position to cut in cropping and a scaling factor in resizing (enlarging/reducing). Then, in step S1819, the system controller 50 generates a header for edited image data. More specifically, the header section of the original image file read in the memory 32 is copied, and the header generation described with reference to FIG. 24 is performed on an image file to be newly generated using the copied header section of the original image file. If the setting of automatically providing classification information is "ON", classification information is automatically provided based on the face information detected in step S1815. A region for the size of an image and an item, such as the creation date and time, are changed as appropriate.

In such a way, the generation of image data for an image file to be newly generated is completed. In step S1811, the file name of the image file to be newly generated is generated. In the present embodiment, the file name IMG_0003.JPG is generated. Then, in step S1812, the system controller 50 writes the image file generated in the above-described way on the storage medium 200, and the editing is completed.

For editing that involves changing the content of an image, such as cropping, classification information is provided again based on an edited image. Therefore, highly convenient operation (e.g., searching) can be made even for edited image data.

If it is determined that the editing to be performed is cropping (NO in step S1813), flow proceeds to step S1820, where the system controller 50 performs the other processing. Examples of the other processing include color transform of an image, altering the shape of an image, and combining. Even in these cases, image analysis corresponding to the editing may be conducted, and the header generation is also performed.

One specific example of the cropping will now be described with reference to FIGS. 25A to 25D.

Figure 25A:
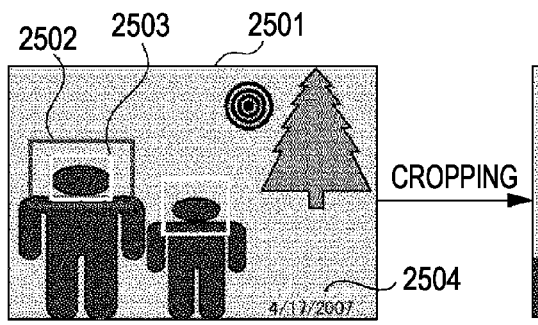
FIGS. 25A to 25D are illustrations for describing a specific example of a cropping process according to the second embodiment.

In FIG. 25A, reference numeral 2501 represents a pre-crop image. Reference numeral 2502 represents a crop specified area to be cropped by an operation from a user. Reference numeral 2503 represents a face-detection focusing frame at the time of capturing. Reference numeral 2504 represents information appearing when the date printing setting is active, and indicates the capturing date. The pre-crop image 2501 has the properties "Tag (classification information): people; No. of people: 2; Date printing: ON; Face coordinates 1: left middle, 10×10; Face coordinates 2: middle, 10×10; Focusing-frame coordinates 1: left middle, 10×10, priority 2; Focusing-frame coordinates 2: middle, 10×10, priority 1; and In-focus image: Yes."

Figure 25B:
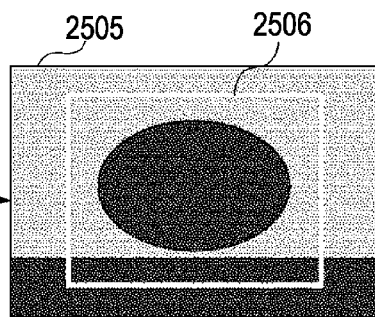

FIG. 25B illustrates a crop image 2505, which remains after the cropping is performed using the crop specified area 2502. From the flowchart of FIGS. 18A and 18B, the properties of the crop image 2505 are "Tag (classification information): people; No. of people: 1; Date printing: OFF; Face coordinates 1: middle, 90×90; and Face coordinates 2: none; Focusing-frame coordinates 1: middle, 90×90, priority 1; Focusing-frame coordinates 2: none; and In-focus image: Yes." The changed properties information enables proper information displaying and searching in reproducing an image. For example, as illustrated in a face-detection focusing frame 2506, even after cropping, which part a face is identified in a subject and where a focusing frame is determined can be displayed.

Figure 25C:
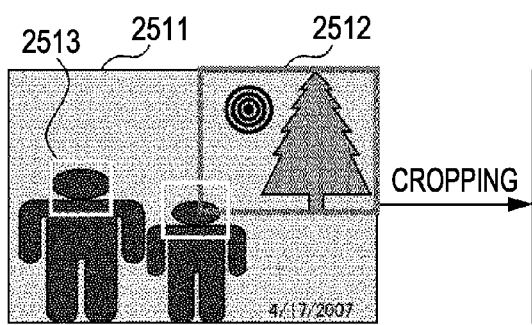

In FIG. 25C, reference numeral represents a pre-crop image 2511. Reference numeral 2512 represents a crop specified area to be cropped by an operation from a user. Reference numeral 2513 represents a face-detection focusing frame at the time of capturing. The pre-crop image 2511 has the properties "Tag (classification information): people; No. of people: 2; Date printing: ON; Face coordinates 1: left middle, 10×10; and Face coordinates 2: middle, 10×10; Focusing-frame coordinates 1: left middle, 10×10, priority 2; Focusing-frame coordinates 2: middle, 10×10, priority 1; and In-focus image: Yes."

Figure 25D:
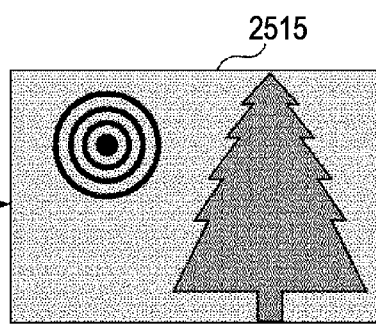

FIG. 25D illustrates a crop image 2515 remaining after the cropping is performed using the crop specified area 2512. From the flowchart of FIGS. 18A and 18B, the properties of the crop image 2515 are "Tag (classification information): landscapes; No. of people: 0; Date printing: OFF; Face coordinates 1: none; and Face coordinates 2: none; Focusing-frame coordinates 1: none; Focusing-frame coordinates 2: none; and In-focus image: No." The changed properties information enables proper information displaying and searching in reproducing an image. For example, the face-detection focusing frame 2511 has the properties "Tag: people", whereas the crop image 2515 has the properties "Tag: landscapes", from the process described with reference to FIGS. 18A and 18B. Accordingly, the crop image 2515, in which people is not captured, will not be retrieved with the retrieval key "people", and can be retrieved with the retrieval key "landscapes."

Both the crop images 2505 and 2515 have the properties "Date printing: OFF" changed from the respective pre-crop images. For example, when a printer that has the capability of adding and printing the date at the time of printing is used, in the case of printing an image in which the date has been embedded, such as the pre-crop images 2501 and 2511, if "Date printing: ON" is set, the printer may suppress printing of the date in order to avoid overlapping of printing of the date information. When the date printed part is excluded from an image, as in the crop images 2505 and 2515, changing the properties to "Date printing: OFF" allows the printer side to add and print the date properly.

As described above, according to the present embodiment, even after an image is edited, proper capturing information can be provided.

The present invention can be achieved by supplying a storage medium that stores program code of software for realizing at least one of the above described embodiments to a system or an apparatus. In this case, a computer (or CPU, microprocessor unit (MPU)) in the system or apparatus reads the program code stored in the storage medium.

In this case, program code in itself read from a storage medium realizes the functions of the above described embodiment, and the program code and the storage medium that stores the program code are included in the scope of the present invention.

Examples of a storage medium for supplying program code include a floppy disk, a hard disk, a magneto-optical disk (MO), a compact-disk read-only memory (CD-ROM), a compact disk recordable (CD-R), magnetic tape, a nonvolatile memory card, and a ROM.

The realization of the functions of at least one of the above described embodiments by a computer executing read program code is also included in the scope of the present invention. For example, the realization of the functions of at least one of the above described embodiments by actual processing in part or in entirety performed by an operating system (OS) running on a computer in accordance with instructions of the program code is also included in the scope of the present invention.

In addition, a case where program code read from a storage medium is written on a memory included in a function expansion board inserted into a computer or a function expansion unit connected to a computer. In this case, actual processing in part or in entirety is performed in accordance with instructions of the program code by, for example, a CPU incorporated in the function expansion unit is also included in the scope of the present invention.

In the foregoing, an example in which the present invention is applied to a digital camera is described. The application is not limited to this example. The present invention is applicable to a printer, a mobile phone, an apparatus that can reproduce an image, such as a mobile terminal.

According to the present embodiment, when an image is edited, classification information corresponding to an edited image is re-provided in accordance with the content of editing. As a result, proper classification information can be provided to an edited image.

According to the present embodiment, even after an image is edited, proper capturing information can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-210242 filed Aug. 10, 2007 and No. 2008-117296 filed Apr. 28, 2008, which are hereby incorporated by reference herein in their entirety.

What is claimed is:

1. An image processing apparatus comprising:
an editing unit configured to execute a trimming edit on an image recorded in a storage medium, wherein, in a case where date information is embedded in the image on which the trimming edit has not been executed yet, classification information indicating that the date information is embedded in the image is associated with the image; and
a control unit configured to invalidate the classification information in a case where there exists no region where the date information is embedded in the image on which the trimming edit has been executed.

2. The image processing apparatus according to claim 1, further comprising:
an image capturing unit configured to capture an image; and
a recording unit configured to record the image in the storage medium.

3. The image processing apparatus according to claim 1, wherein the image is recorded while information indicating a focus position in the image is further associated with the image, and
wherein the control unit is configured to update the information indicating the focus position to be associated with the image on which the trimming edit has been executed.

4. A method for controlling an image processing apparatus, the method comprising:
executing a trimming edit on an image recorded in a storage medium, wherein, in a case where date information is embedded in the image on which the trimming edit has not been executed yet, classification information indicating that the date information is embedded in the image is associated with the image; and
performing control to invalidate the classification information in a case where there exists no region where the date information is embedded in the image on which the trimming edit has been executed.

5. The method according to claim 4, further comprising:
capturing an image; and
recording the image in the storage medium.

6. The method according to claim 4,
wherein the image is recorded while information indicating a focus position in the image is further associated with the image, and
wherein, by the performing control, the information indicating the focus position to be associated with the image on which the trimming edit has been executed is updated.

* * * * *